(12) United States Patent
Doerring et al.

(10) Patent No.: US 10,521,672 B2
(45) Date of Patent: Dec. 31, 2019

(54) IDENTIFYING AND CATEGORIZING CONTEXTUAL DATA FOR MEDIA

(71) Applicant: OpenTV, Inc., San Francisco, CA (US)

(72) Inventors: Nicholas Daniel Doerring, San Francisco, CA (US); John Michael Teixeira, Oakland, CA (US); Steven J. Szymanski, San Jose, CA (US); Claes Georg Andersson, Berkeley, CA (US)

(73) Assignee: OPENTV, INC., San Francisco, CA (US)

( * ) Notice: Subject to any disclaimer, the term of this patent is extended or adjusted under 35 U.S.C. 154(b) by 220 days.

(21) Appl. No.: 14/587,926

(22) Filed: Dec. 31, 2014

(65) Prior Publication Data

US 2016/0188981 A1    Jun. 30, 2016

(51) Int. Cl.
| | | |
|---|---|---|
| G06K 9/00 | (2006.01) | |
| G06K 9/46 | (2006.01) | |
| G06F 16/245 | (2019.01) | |
| G06F 16/783 | (2019.01) | |

(52) U.S. Cl.
CPC ....... G06K 9/00758 (2013.01); G06F 16/245 (2019.01); G06F 16/785 (2019.01); G06F 16/7834 (2019.01); G06K 9/00765 (2013.01); G06K 9/4661 (2013.01)

(58) Field of Classification Search
CPC ......... G06F 17/30784; G06F 17/30787; G06F 17/30802; G06F 17/30424; G06F 17/30858; G06F 17/3082; G06F 17/30799; G06K 9/00758; G06K 9/00765; G06K 9/4661
USPC ....................................................... 382/305
See application file for complete search history.

(56) References Cited

U.S. PATENT DOCUMENTS

| | | | |
|---|---|---|---|
| 5,751,378 A * | 5/1998 | Chen | H04N 5/145 348/699 |
| 6,674,448 B1 | 1/2004 | Garahi et al. | |
| 7,356,830 B1 * | 4/2008 | Dimitrova | G06F 17/30787 375/E7.001 |
| 8,953,836 B1 * | 2/2015 | Postelnicu | G06K 9/00758 382/100 |
| 9,740,775 B2 * | 8/2017 | Wang | G06F 16/783 |
| 10,013,614 B2 * | 7/2018 | Granstrom | G06K 9/00711 |
| 2003/0093790 A1 | 5/2003 | Logan et al. | |
| 2005/0044561 A1 | 2/2005 | McDonald | |
| 2008/0154908 A1 * | 6/2008 | Datar | G06F 17/30817 |
| 2008/0208851 A1 * | 8/2008 | Briggs | H04H 20/14 |
| 2008/0256568 A1 * | 10/2008 | Rowland | H04H 20/14 725/22 |
| 2008/0313541 A1 | 12/2008 | Shafton et al. | |

(Continued)

FOREIGN PATENT DOCUMENTS

| | | |
|---|---|---|
| GB | 2487499 A | 7/2012 |
| WO | 2007130472 A2 | 11/2007 |
| WO | 2012135804 A2 | 10/2012 |

OTHER PUBLICATIONS

Bertini, Marco, Alberto Del Bimbo, and Walter Nunziati. "Video clip matching using MPEG-7 descriptors and edit distance." International Conference on Image and Video Retrieval. Springer Berlin Heidelberg, 2006.*

(Continued)

*Primary Examiner* — Wesley J Tucker
(74) *Attorney, Agent, or Firm* — Polsinelli LLP

(57) ABSTRACT

Systems and methods for identifying and associating contextual metadata across related media.

30 Claims, 19 Drawing Sheets

(56) References Cited

U.S. PATENT DOCUMENTS

| | | | |
|---|---|---|---|
| 2009/0154806 A1* | 6/2009 | Chang | G06F 17/30781 |
| | | | 382/173 |
| 2010/0011392 A1* | 1/2010 | Bronstein | G06K 9/00758 |
| | | | 725/28 |
| 2010/0104184 A1* | 4/2010 | Bronstein | G06F 17/30784 |
| | | | 382/170 |
| 2010/0115003 A1 | 5/2010 | Soules et al. | |
| 2010/0125875 A1 | 5/2010 | Hays et al. | |
| 2010/0275224 A1 | 10/2010 | Sheng et al. | |
| 2011/0222787 A1* | 9/2011 | Thiemert | G06F 17/30802 |
| | | | 382/225 |
| 2012/0189212 A1* | 7/2012 | Ren | G06T 7/0038 |
| | | | 382/218 |
| 2012/0254917 A1 | 10/2012 | Burkitt et al. | |
| 2013/0111514 A1 | 5/2013 | Slavin et al. | |
| 2013/0139209 A1 | 5/2013 | Urrabazo et al. | |
| 2013/0268533 A1 | 10/2013 | Komarov | |
| 2013/0343598 A1 | 12/2013 | Kocks et al. | |
| 2014/0098293 A1 | 4/2014 | Ishtiaq et al. | |
| 2014/0280035 A1 | 9/2014 | Fraser et al. | |
| 2014/0349750 A1 | 11/2014 | Thompson et al. | |
| 2015/0088890 A1 | 3/2015 | Hoffert et al. | |
| 2015/0089075 A1 | 3/2015 | Strigeus et al. | |
| 2015/0319470 A1 | 11/2015 | Tang et al. | |
| 2016/0078032 A1* | 3/2016 | Wang | G06F 17/3005 |
| | | | 707/737 |

OTHER PUBLICATIONS

Diakopoulos, Nicholas, and Stephan Volmer. "Temporally tolerant video matching." Proc. of the ACM SIGIR Workshop on Multimedia Information Retrieval. 2003.*

Karpenko, Alexandre, and Parham Aarabi. "Tiny videos: a large data set for nonparametric video retrieval and frame classification." IEEE Transactions on Pattern Analysis and Machine Intelligence 33.3 (2011): 618-630.*

European Patent Office, extended European Search Report, Application No. 15199698.0, dated Mar. 31, 2016, 10 pages.

Oostveen et al., "Feature Extraction and a Database Strategy for Video Fingerprinting", Security in Communication Networks: Third International Conference; Revised Papers / SCN 2002, Amalfi, Italy, Sep. 11-13, 2002, LNCS, Springer Verlag, DE, vol. 2314, Mar. 11, 2002, pp. 117-128, XP009017770.

Extended European Search Report for EP App No. 15199699.8 dated Mar. 21, 2016, 13 pgs.

International Search Report and Written Opinion for PCT App No. PCT/US2015/064541 dated 15, 2016, 11 pgs.

* cited by examiner

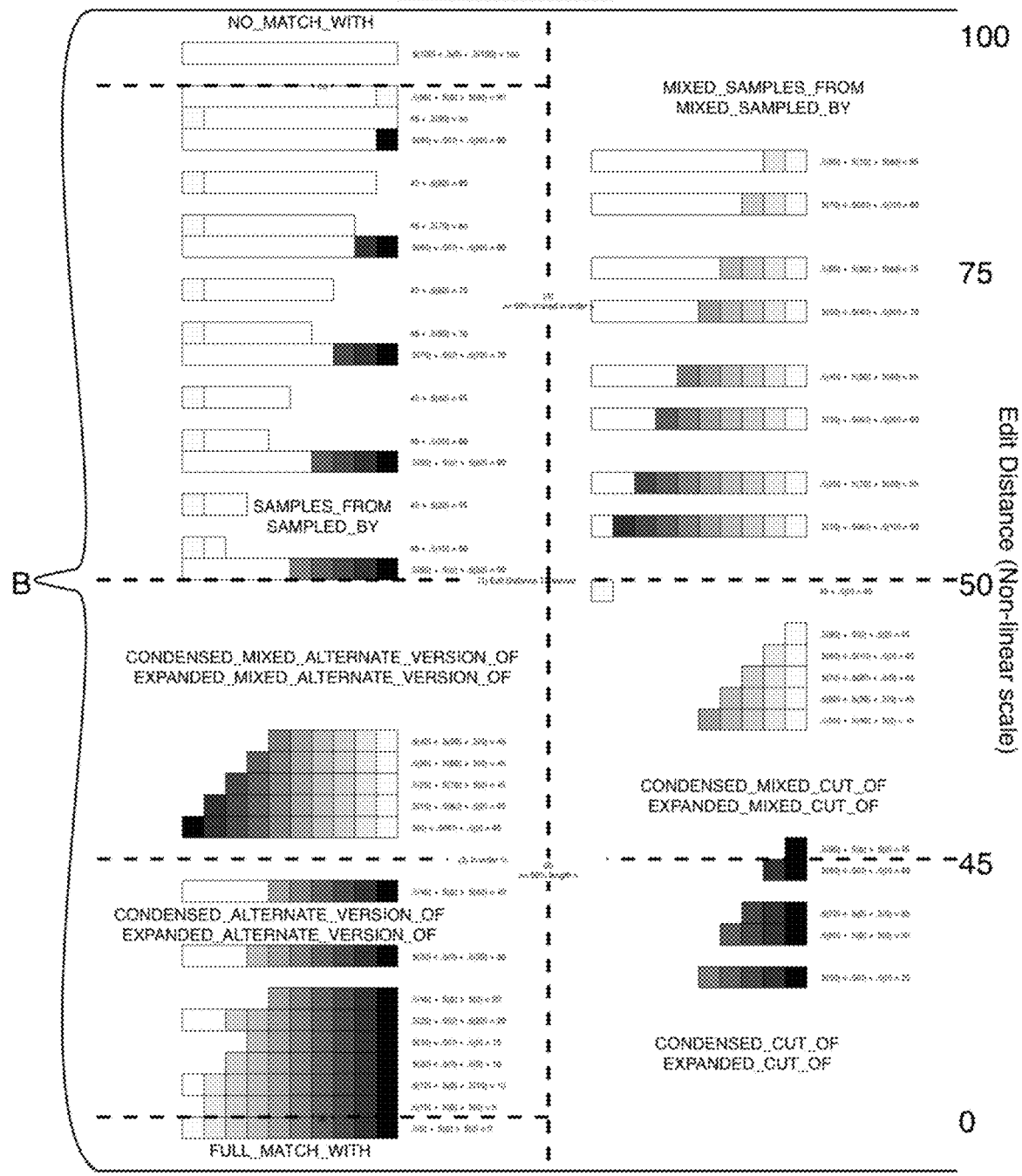

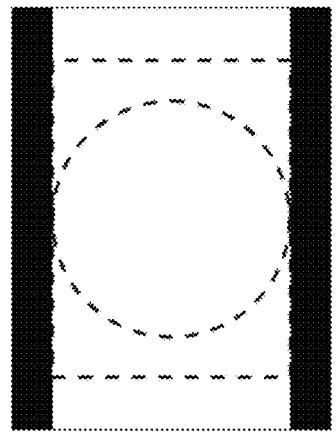
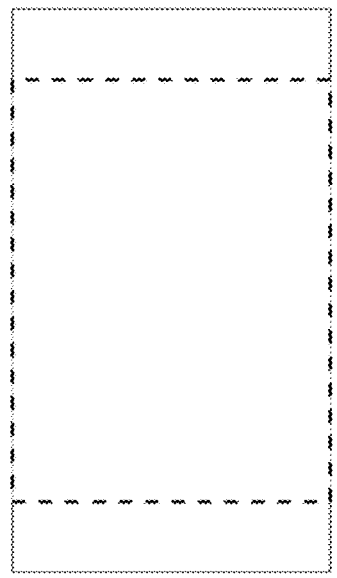
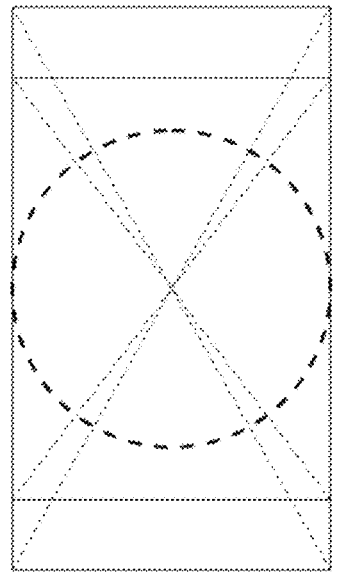
FIG. 15A
FIG. 15B
FIG. 15C

IDENTIFYING AND CATEGORIZING CONTEXTUAL DATA FOR MEDIA

CROSS REFERENCE TO RELATED APPLICATIONS

This application is related to copending U.S. application Ser. No. Unassigned, entitled Management, Categorization, Contextualizing and Sharing of Metadata-Based Content for Media, filed on Dec. 31, 2014 concurrently herewith by the same Applicant, OpenTV, Inc, the entirety of which is incorporated by reference hereby.

DESCRIPTION OF RELATED TECHNOLOGY

Data systems and methods for identifying and storing digital media items, for example, audio or video for a media item such as a song or movie, have been developed. Media, however, can have many relationships to other pieces of media. A given media item can have relationships to other media items. For example a movie can be an extended version (mostly added scenes), a cut for TV version (with commercials), a PG version (scenes cut/censored), a theatrical version (scenes added/edited/removed/rearranged), or even contain one or more clips embedded from another piece of media (like a movie review show).

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein:

FIG. 13 shows a simplified relationship category diagram;

FIGS. 15A-15C illustrates embodiments of frame cropping.

DETAILED DESCRIPTION OF THE EMBODIMENTS

Figure 1:
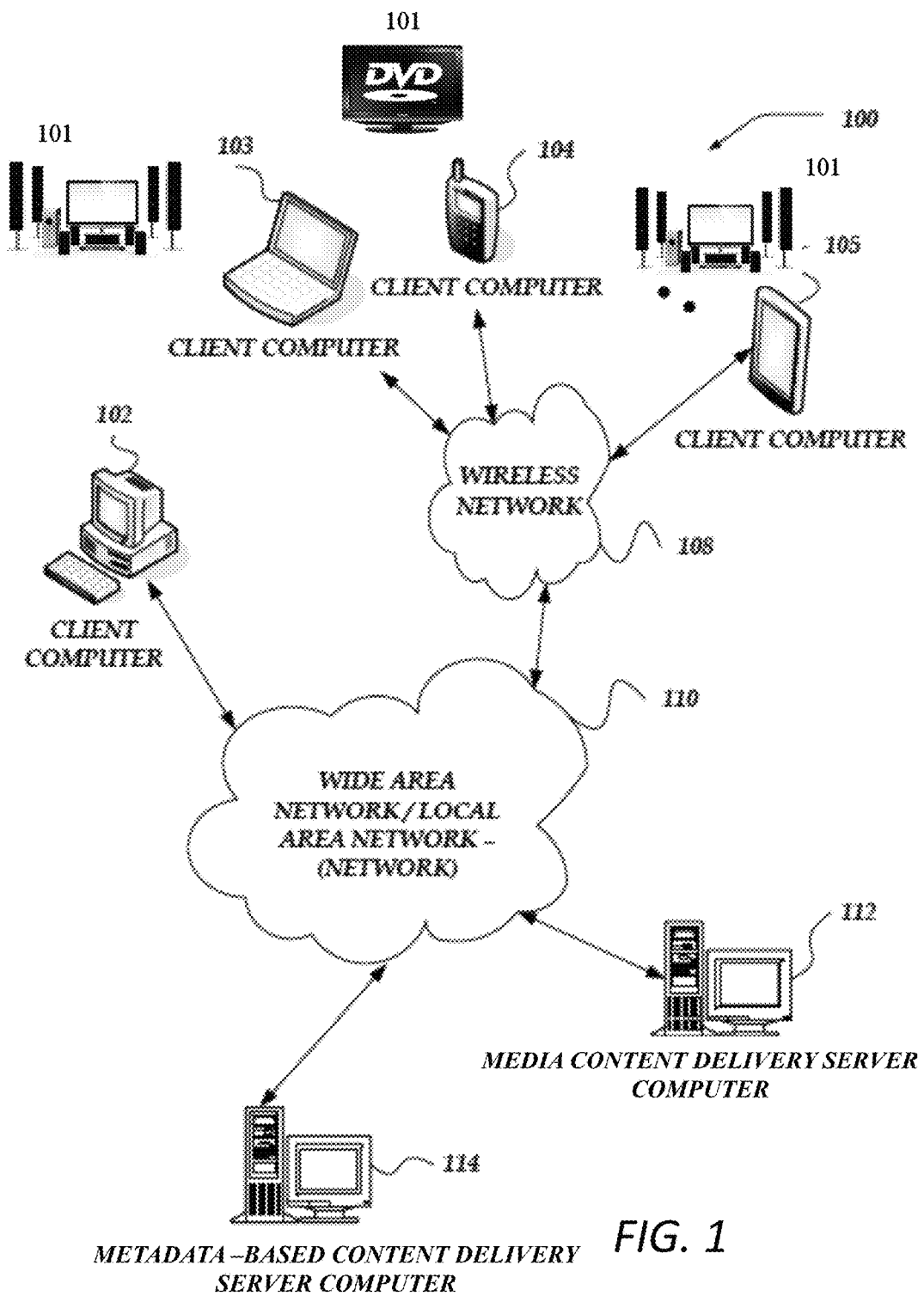
FIG. 1 is a system diagram of an environment in which at least one of the various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Media can have many relationships to other pieces of media. A given media item can have relationships to other media items. For example a movie can be an extended version (mostly added scenes), a cut for TV version (with commercials), a PG version (scenes cut/censored), a theatrical version (scenes added/edited/removed/rearranged), or even contain one or more clips embedded from another piece of media (like a movie review show).

Described is an automated system that is able to identify the segments that are common between two pieces of media. Then the system classifies the type of relationship as: no match, sampling, mixed sampling, alternate version, mixed alternate version, cut, mixed cut, or full match. The sampling relation can be further sub-categorized by the dominant type of sampling: audio, video, or both. Alternate versions can be further sub-categorized by the dominant difference: extended, condensed.

The embodiment shares data across media even if the system has no access to the media for direct comparison at the time of sharing. The system determines if the audio and video match for each common segment with or without having access to the original media.

Figure 10A:
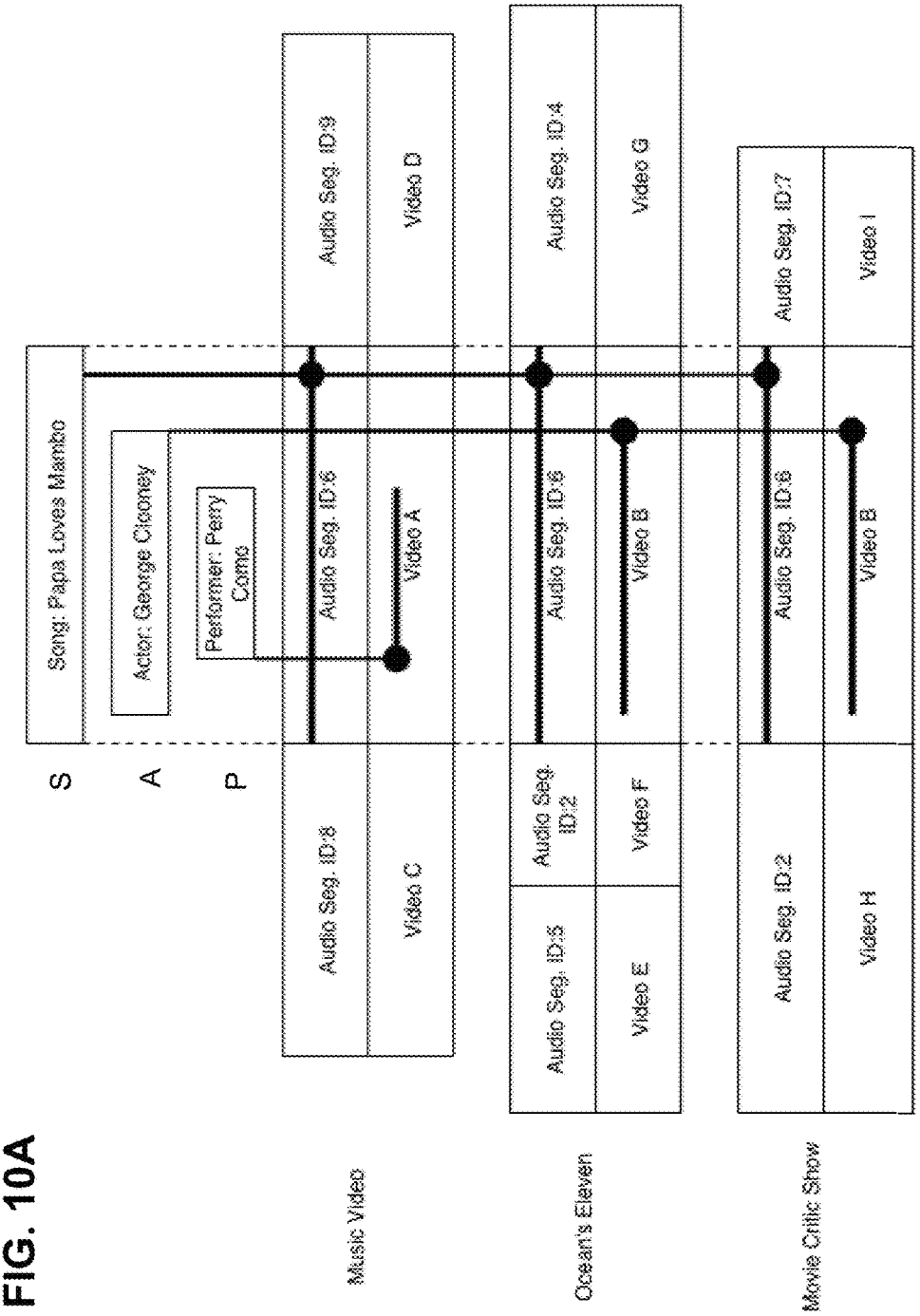
FIGS. 10A-10B are illustrations of an example of different context categories for a shared segment in accord with at least one of the various embodiments.

An example of this problem would be a song that is played in multiple different pieces of media. Referring to FIG. 10A, in this example, a segment of a song is used in three pieces of media: a music video, the movie Ocean's Eleven, and a movie critic show. The movie and the critic show share both the same audio and video clip, but the music video actually has video of the performance of the song. The segments between the dotted lines marked with "Audio" and "Video" represent segments of audio and video from the pieces of media listed to the left. The boxes S, A, P represent data that should be associated with the media. The dots indicate which media the data applies to and the horizontal lines indicate the time range that the data applies. Note that the data may apply to the audio or the video depending on the segment that the dot is in.

Once common segments have been determined between multiple pieces of media, then it becomes important to know if the Audio and the Video both match in all pieces of media. Based on this information, data associated with the audio or video of one piece of media can then be shared with the other media. In the above example the song S Papa Loves Mambo information applies to all shared segments. Performer P Perry Como may only show up in the music video performance of the song, so this data is not shared with the other versions. Actor A George Clooney appears in Ocean's Eleven and the Movie Critic Show, so this information can be shared with both pieces of media.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a computer system, computerized method, and computer programs for identifying and associating metadata across related media with the same content. The system can comprise one or more processors operative to execute instructions; an operative connection to a plurality of database. The computer system, computerized method, and computer programs can comprise non-transitory memory operatively coupled to at least one of the including computer executable instructions; the one or more processors programmed at least to, when the program memory instructions are executed by the processors, sample a new media item to create a signature sample;
compare the signature sample of the new media item against a signature database to identify at least one matching signature for a media item;
identify common portions of the signature sample of the new media item and the matching signature;
obtain additional contextual data about the new media item; and
determine if the additional contextual data is substantially similar for each common portion.

In various embodiments, the computer system, computerized method, and computer programs can further comprise the one or more processors being programmed at least to:
sample the new media item to create an audio signature sample;
compare the audio signature sample of the new media item against a signature database to identify at least one matching audio signature for a media item;
identify common portions of the audio signature sample of the new media item and the matching audio signature;
map the common portions of the audio signature sample of the new media item and the matching audio signature to one or more common segments in a segment database, the segment database comprising a plurality of segments corresponding to a segment of the media item;
obtain additional contextual data about the new media item, the contextual data including a video context, a narrative context, or both; and
determine if the additional contextual data is substantially similar for each common segment.

In various embodiments, the computer system, computerized method, and computer programs can further comprise the one or more processors being programmed at least to: analyze video frame data from a media item; and obtain the visual context with a video context detector selected from an image luminosity algorithm or a frame differential algorithm. The computer system, computerized method, and computer programs can further comprise the one or more processors being programmed at least to: calculate an image luminosity with the image luminosity detector to determine an average brightness of image data for every frame of the video frame data. The computer system, computerized method, and computer programs can further comprise the one or more processors being programmed at least to: calculate a frame difference between consecutive pairs of frames of the video data. The computer system, computerized method, and computer programs can further comprise the one or more processors being programmed at least to: determine that video data for the common segment are substantially similar if a differential for the video data of the new media item and the matching media item falls below a predetermined threshold. The computer system, computerized method, and computer programs can further comprise the one or more processors being programmed at least to: frame crop the video frame data to capture approximately a same pixel data for each frame in different versions of the media item.

In various embodiments, the computer system, computerized method, and computer programs can further comprise the one or more processors being programmed at least to: obtain a media playlist associated with the one or more previously identified segments for the matching media item; compare the media playlist including the common segments for the new media item with the media playlist for the matching media item; and categorize relationships between the media playlists into at least one of a plurality of relationship categories.

In various embodiments, the computer system, computerized method, and computer programs can further comprise the one or more processors being programmed at least to: employ direct audio/video comparison techniques to generate the media playlists. The computer system, computerized method, and computer programs can further comprise the one or more processors being programmed at least to: employ ACR fingerprint comparison to generate the media playlists.

In various embodiments, the computer system, computerized method, and computer programs can further comprise the one or more processors being programmed at least to: process the segments using an edit distance algorithm to obtain the narrative context. The computer system, computerized method, and computer programs can further comprise the one or more processors being programmed at least to:

process the segments using a modified edit distance algorithm to obtain the narrative context. The computer system, computerized method, and computer programs can further comprise the one or more processors being programmed at least to: determine a contextual relationship new media item and the matching media item by identifying a longest sequence of in-order segments between new media item and the matching media item and determining a percentage for the longer sequence.

In various embodiments, the computer system, computerized method, and computer programs can further comprise the one or more processors being programmed at least to determine a contextual relationship new media item and the matching media item by identifying all common segments between new media item and the matching media item and determining a percentage of for longer item of media.

Illustrative Operating Environment

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes local area networks (LANs) wide area networks (WANs)—(network) 110, wireless network 108, client computers 102-105, Media Content Delivery Server Computer 112, and Metadata-Based Content Delivery Server Computer 114.

At least one embodiment of client computers 102-105 is described in more detail below in conjunction with FIG. 2. In one embodiment, at least some of client computers 102-105 may operate over a wired and/or wireless network, such as networks 110 and/or 108. Generally, client computers 102-105 may include virtually any computer capable of communicating over a network to send and receive information, perform various online activities, offline actions, or the like. In various embodiments, one or more of client computers 102-105 can be configured to operate with conjunction with a media device or system 101, for example a television, radio, another computer, a tablet device, as smart phone, or any device enabled to allow a user to consume media. For example, a client device 105 can be configured to send data from a user consuming a media product on a media device or system 101, for example a movie, television show, or listening to music from␣␣another source or media device or system 101, e.g.: a television, a radio, a home theater, a sound system, another computer, or even in a movie theater, etc. In various embodiments the media product may be provided to the user locally, for example via DVD, CD, or any locally or physically stored media, etc. and can also be provided by a media content delivery service, such as a streaming media service, which can be provided by the Media Content Delivery Server 112 to the other media device 101 (e.g. a television or another computer). Client computers 102-105 need not of course be constrained to such use and may also be employed, for example, as an end-user computing node, or any other typical use for a computer device.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable personal computer capable of connecting to another computing device and receiving information such as, laptop computer 103, smart mobile telephone 104, and tablet computers 105, and the like. However, portable computers are not so limited and may also include other portable devices such as cellular telephones, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer may employ the browser application to perform various activities over a network (online). However, another application may also be used to perform various online activities.

A web-enabled client computer may include a browser application that is configured to receive and to send web pages, web-based messages, and the like. The browser application may be configured to receive and display graphics, text, multimedia, and the like, employing virtually any web-based language, and the like. In one embodiment, a user of the client computer may employ the browser application to perform various activities over a network (online). However, another application may also be used to perform various online activities.

Client computers 102-105 may also include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Media Content Delivery Server Computer 112, Metadata-Based Content Delivery Server Computer 114, or other computers.

Client computers 102-105 may further be configured to include a client application that enables an end-user to log into an end-user account that may be managed by another computer, such as Metadata-Based Content Delivery Server Computer 114, Media Content Delivery Server Computer 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, LTE, 4G, 5G, and future access networks may enable wide area coverage for mobile devices, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, and the like.

Network 110 is configured to couple network computers with other computers and/or computing devices, including, Media Content Delivery Server Computer 112, Metadata-Based Delivery Server Computer 114, client computer 102, and client computers 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of a Metadata-Based Delivery Server Computer 114 is described in more detail below in conjunctions with FIG. 3. Briefly, however, Metadata-Based Content Delivery Server Computer 114 includes virtually any network computer capable of delivering metadata-based content to a client user and accepting requests and data therefrom. For example, a client device 105 can be configured to send data from a user consuming a media product, for example a movie, television show, or listening to music from or another source or media device, e.g.: a television, a radio, a, movie theater, etc. The Metadata-Based Content Delivery Server Computer 114 can then deliver, inter alia, complementary synchronous metadata-based content based on the identification of the media being consumed by the user. Computers that may be arranged to operate as Metadata-Based Content Delivery Server Computer 114 include various network computers, including, but not limited to multiprocessor systems, server computers, and the like.

Although FIG. 1 illustrates Metadata-Based Delivery Server Computer 114 as a single computer, the invention is not so limited. For example, one or more functions of the Metadata Delivery Server Computer 114 may be distributed across one or more distinct network computers. Moreover, Metadata-Based Delivery Server Computer 114 is not limited to a particular configuration. Thus, in one embodiment, Metadata-Based Delivery Server Computer 114 may contain a plurality of network computers. In another embodiment, Metadata-Based Delivery Server Computer 114 may contain a plurality of network computers that operate using a master/slave approach, where one of the plurality of network computers of Metadata-Based Delivery Server Computer 114 is operative to manage and/or otherwise coordinate operations of the other network computers. In other embodiments, the Metadata-Based Delivery Server Computer 114 may operate as a plurality of network computers arranged in a cluster architecture, a peer-to-peer architecture, and/or even within a cloud architecture. Thus, embodiments are not to be construed as being limited to a single environment, and other configurations, and architectures are also envisaged.

Although illustrated separately, Media Content Delivery Server Computer 112 and Metadata-Based Delivery Server Computer 114 may be employed as a single network computer, separate network computers, a cluster of network computers, or the like. In some embodiments, either Media Content Delivery Server Computer 112 or Metadata-Based Delivery Server Computer 114, or both, may be enabled to deliver content, respond to user interactions with the content, track user interaction with the content, update widgets and widgets controllers, or the like.

Illustrative Client Computer

Figure 2:
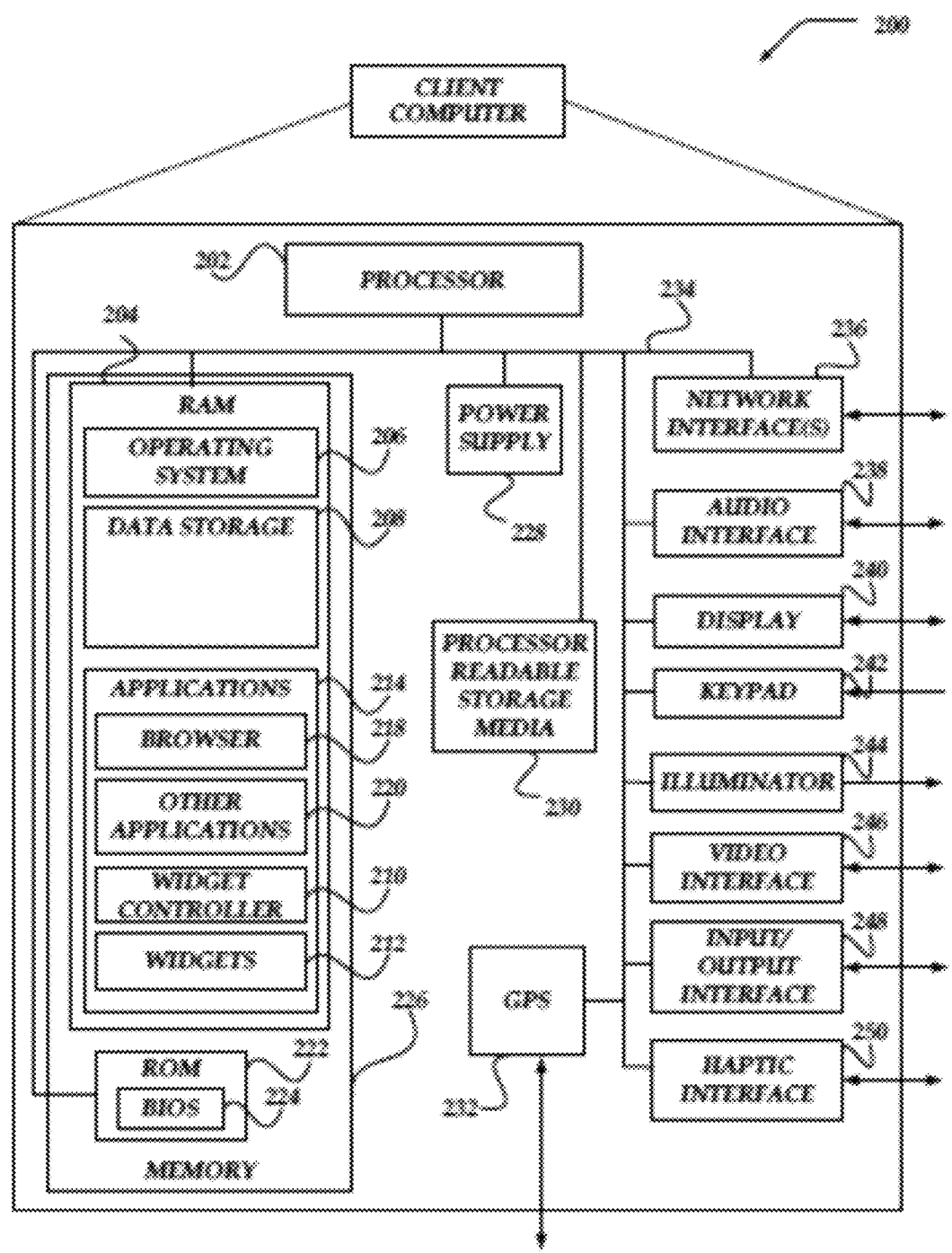
FIG. 2 shows an embodiment of a client computer that may be included in a system such as that shown in FIG. 1.

FIG. 2 shows one embodiment of Client Computer 200 that may be included in a system implementing embodiments of the invention. Client Computer 200 may include many more or less components than those shown in FIG. 2. However, the components shown are sufficient to disclose an illustrative embodiment for practicing the present invention.

Client Computer 200 may represent, for example, one embodiment of at least one of Client Computers 102-105 of FIG. 1.

As shown in the figure, Client Computer 200 includes a processor 202 in communication with a mass memory 226 via a bus 234. In some embodiments, processor 202 may include one or more central processing units (CPU). Client Computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232 or other geolocation components, Power supply 228 provides power to Client Computer 200. A rechargeable or non-rechargeable battery may be used to provide power. The power may also be provided by an external power source, such as an alternating current (AC) adapter or a powered docking cradle that supplements and/or recharges a battery.

Client Computer 200 may optionally communicate with a base station (not shown), or directly with another computer. Network interface 236 includes circuitry for coupling Client Computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of media from another source (e.g., television, radio, etc.). For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the Client Computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computing computer is calling. Accelerometers and other kinetic or force-based interfaces can be included as well.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of client computer 200, including, but not limited to processor readable storage media 230, a disk drive or other computer readable storage devices (not shown) within client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, HTML, XML, and the like, to display and send a message. However, any of a variety of other web-based programming languages may be employed. In one embodiment, browser 218 may enable a user of client computer 200 to communicate with another network computer, such as Metadata-Based Content Delivery Server Computer 112 and/or Metadata Associations Server Computer 114 of FIG. 1.

Applications 214 may also include Widget Controller 210 and one or more Widgets 212. Widgets 212 may be collections of content provided to the client computer by Metadata Delivery Server Computer 112. Widget Controller 210 may be a program that may be provided to the client computer by Metadata Delivery Server Computer 112. Widget Controller 210 and Widgets 212 may run as native client computer applications or they may run in Browser 218 as web browser based applications. Also, Widget Controller 210 and Widgets 212 may be arranged to run as native applications or web browser applications, or combination thereof.

As used herein, the term "widget controller" refers to a computer program that may be operative on a client application. Widget controllers may be downloaded and/or otherwise deployed to a client application. Widget controllers may be arranged to be operative for downloading content, monitoring media, or otherwise managing widgets located within client applications.

As used herein, the term "widget" refers to a user-interface element located in the client application. Widgets may be invisible or visible to users of the client applications. In some cases, a widget controller may generate widget "on-the-fly" before deploying content into the widget. Widgets may be adapted to reflect the operating environment of the client application that they are being hosted within. For example, in clients that support HTML, CSS a widget may be an HTML element such as a DIV, P, or the like. For client application operative in a Java environment, a widget may be a View object or Window object, and so on.

Illustrative Network Computer

Figure 3:
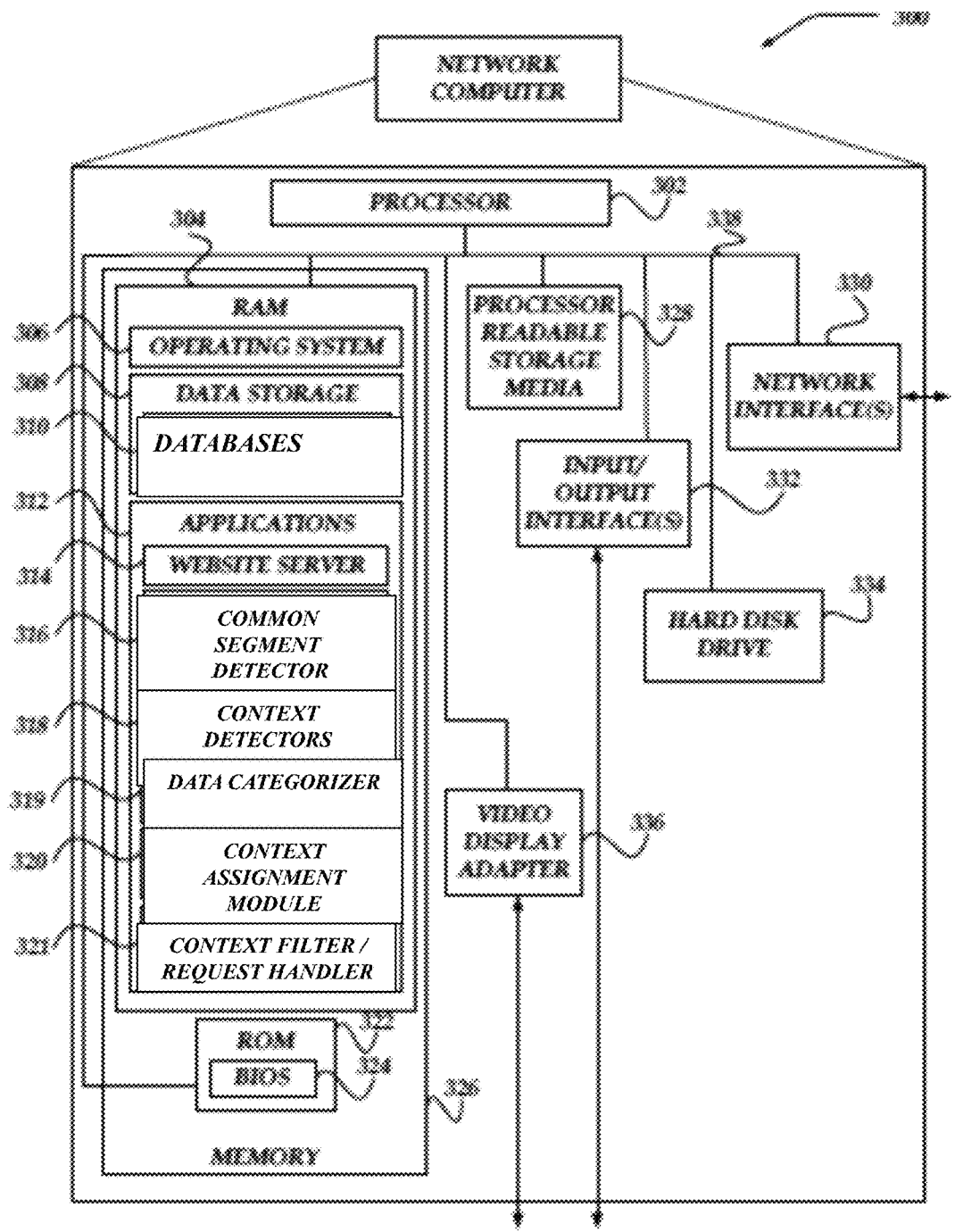
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other computer. Network computer 300 may represent, for example Media Content Delivery Server Computer 112 and/or Metadata-Based Delivery Server Computer 114 of FIG. 1, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data such as content 310. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within client computer 300.

Data storage 308 may include a database, text, spreadsheet, folder, file, or the like, that may be configured to maintain and store user account identifiers, user profiles, email addresses, IM addresses, and/or other network addresses; or the like.

Figure 4:
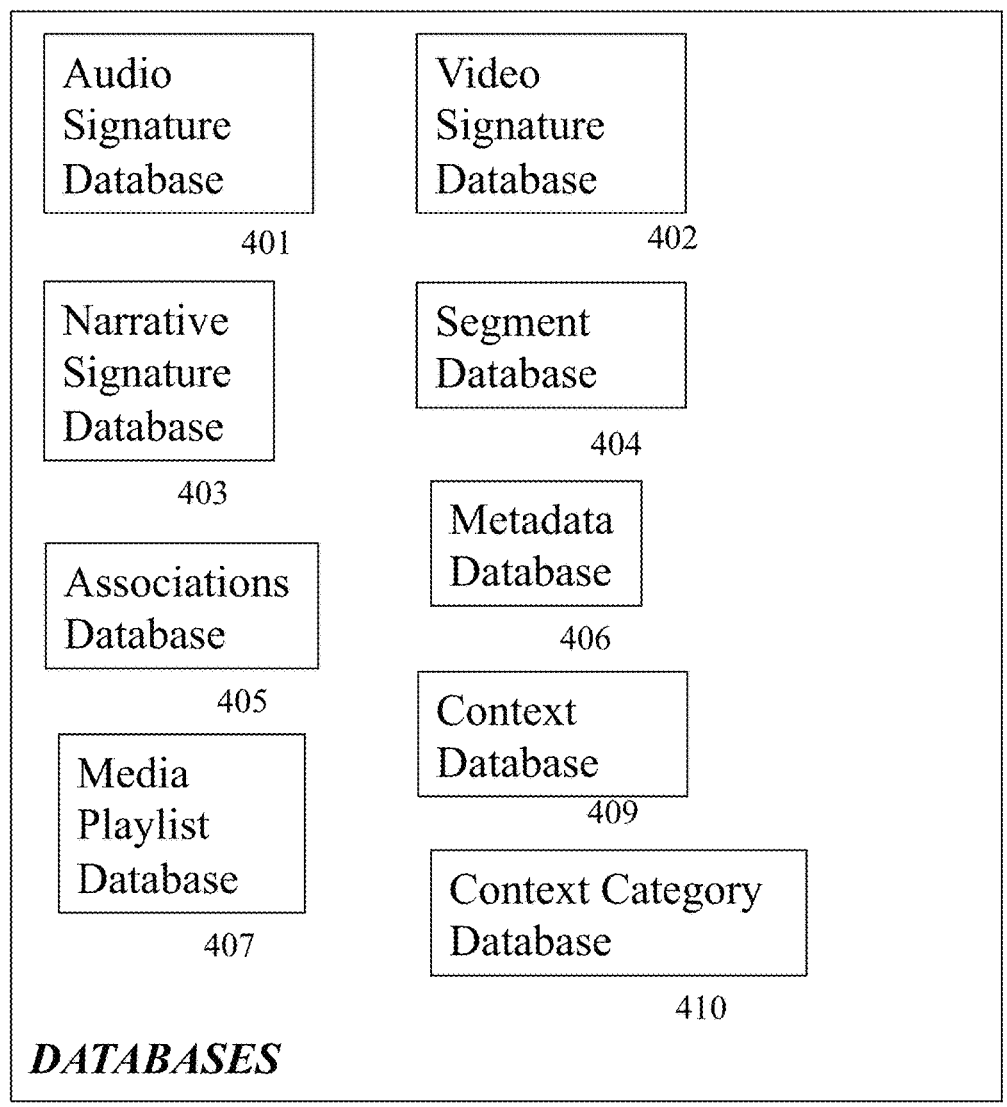
FIG. 4 illustrates a plurality of databases that may be included in a system such as that shown in FIG. 1.

In at least one of the various embodiments, data storage 308 may include databases 310. In various embodiments, as shown in FIG. 4, databases include such as one or more signature databases (e.g. an audio signature database 401, a video signature database 402, a narrative signature database 403), a segment database 404, an associations database 405, a metadata database 406, a media playlist database 407, a context database 409, and a context category database 410. Although the system shows the databases 310 as included in the system and server 300, one or more of the databases can be external to the server or system and operatively connected thereto.

Returning to FIG. 3, data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 312 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 may also include, for example, a website server 314, a Common Segment Detector Application 316, one or more Context Difference Detector Applications 318, a Data Categorizer Application 319, a Context Assignment Module 320, and/or Context Filtering and Request Handler 321.

Website server 314 may represents any of a variety of information and services that are configured to provide content, including messages, over a network to another computer. Thus, website server 314 can include, for example, a web server, a File Transfer Protocol (FTP) server, a database server, a content server, or the like. Website server 314 may provide the content including messages over the network using any of a variety of formats including, but not limited to HTML, XML, Compact HTML (cHTML), Extensible HTML (xHTML), or the like.

In at least one of the various embodiments, Applications 312 may be operative on Metadata-Based Content Delivery Server Computer 114 of FIG. 1. Applications 312 may employ processes, or parts of processes, similar to those described in conjunction with FIGS. 6-15, to perform at least some of its actions.

Illustrative Logical System Architecture

Figure 5:
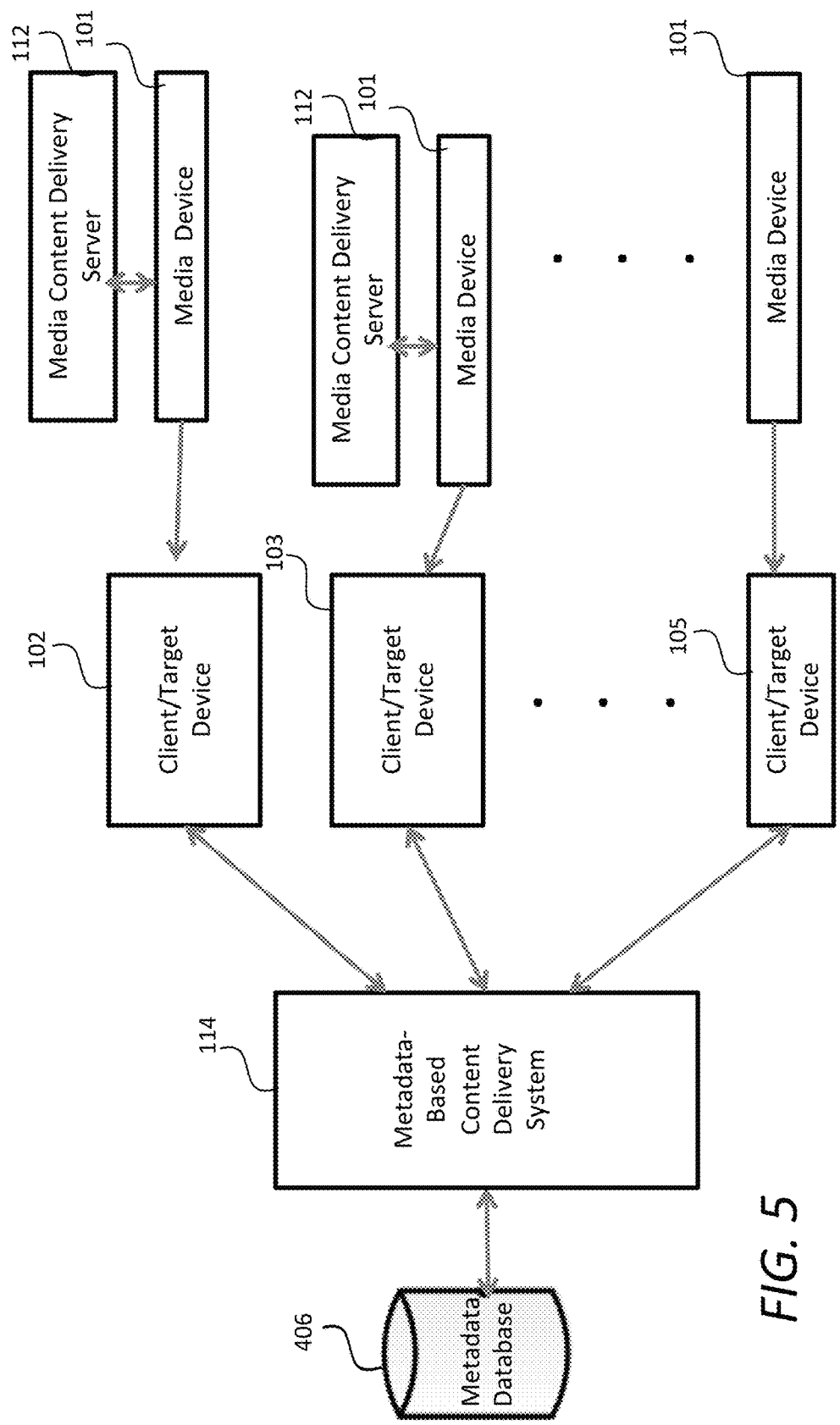
FIG. 5 represents a logical architecture for a system for metadata delivery that may be included in a system such as that shown in FIG. 1

FIG. 5 illustrates a logical architecture of system 100 for various embodiments. In at least one of the various embodiments, content served from and/or hosted on Metadata-Based Delivery Server Computer 114 may be provided over a network to one or more target devices or client computers, such as, client computer 102, client computer 103 client computer 105, client computer, or the like. Exemplary target/client devices can include tablet, a set top box or a BD/DVD player.

Metadata-Based Content Delivery Server Computer 114 includes virtually any network computer capable of delivering metadata content to a client user and accepting requests and data therefrom. For example, a client device 105 can be configured to send data from a user consuming a media product on a media device or system 101, for example a movie, television show, or listening to music from or another source or media device or system 101, e.g.: a television, a radio, a home theater, a sound system, another computer, or even in a movie theater, etc. In various embodiments the media product may be provided to the user locally, for example via DVD, CD, or any locally or physically stored media, etc. and can also be provided by a media content delivery service, such as a streaming media service, which can be provided by the Media Content Delivery Server 112 to the other media device 101 (e.g. a television or another computer). In various embodiments the media product may be provided to the user locally, for example via DVD, CD, or any locally or physically stored media, etc., and can also be provided by a media content delivery service, such as a streaming media service, which can be provided by the Media Content Delivery Server 112 to the other media device or system 101. The client device 105 can receive audio signals from the media product via the audio interface 238 and transmit the data for the media product to the Metadata-Based Content Delivery Server Computer 114 so that the media can be identified via, for example, a signature such as an automated content recognition (ACR) fingerprint. As known in the art, ACR technology allows the system to look up media within a library and the offset into the media that may match an audio or video sample taken from another piece of media. ACR converts the audio or video to an alternate format, referred to as a fingerprint, which can be saved in a database such as an ACR database, and the media item can then be identified without saving the raw data for the media item. Although ACR fingerprints are referred to herein, signatures can include any digital sampling techniques and variants thereof that can be employed create and store information, i.e., a digital signature, to uniquely identify a digital item or digitally represented item such as a media item. The Metadata-Based Content Delivery Server Computer 114 can then deliver, inter alia, complementary synchronous content stored in a metadata database 104 based on the identification of the media being consumed by the user. As noted above with respect to FIG. 4, the metadata database can be external to the Metadata-Based Content Delivery Server Computer 114, though it can be an internal database or a combination of internal and external databases.

One of ordinary skill in the art will appreciate that the architecture of the system is a non-limiting example that is illustrative of at least a portion of at least one of the various embodiments. As such, more or less components may be employed and/or arranged differently without departing from the scope of the innovations described herein.

Generalized Operation

The operation of certain aspects of the invention will now be described with respect to FIGS. 6-15. In at least one of various embodiments, processes described in conjunction with FIGS. 6-15, respectively, may be implemented by and/or executed on a single network computer, such as network computer 300 of FIG. 3. In other embodiments, these processes or portions of these processes may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 6-15 may be operative in system with logical architectures such as those described in conjunction with FIG. 5.

Figure 6:
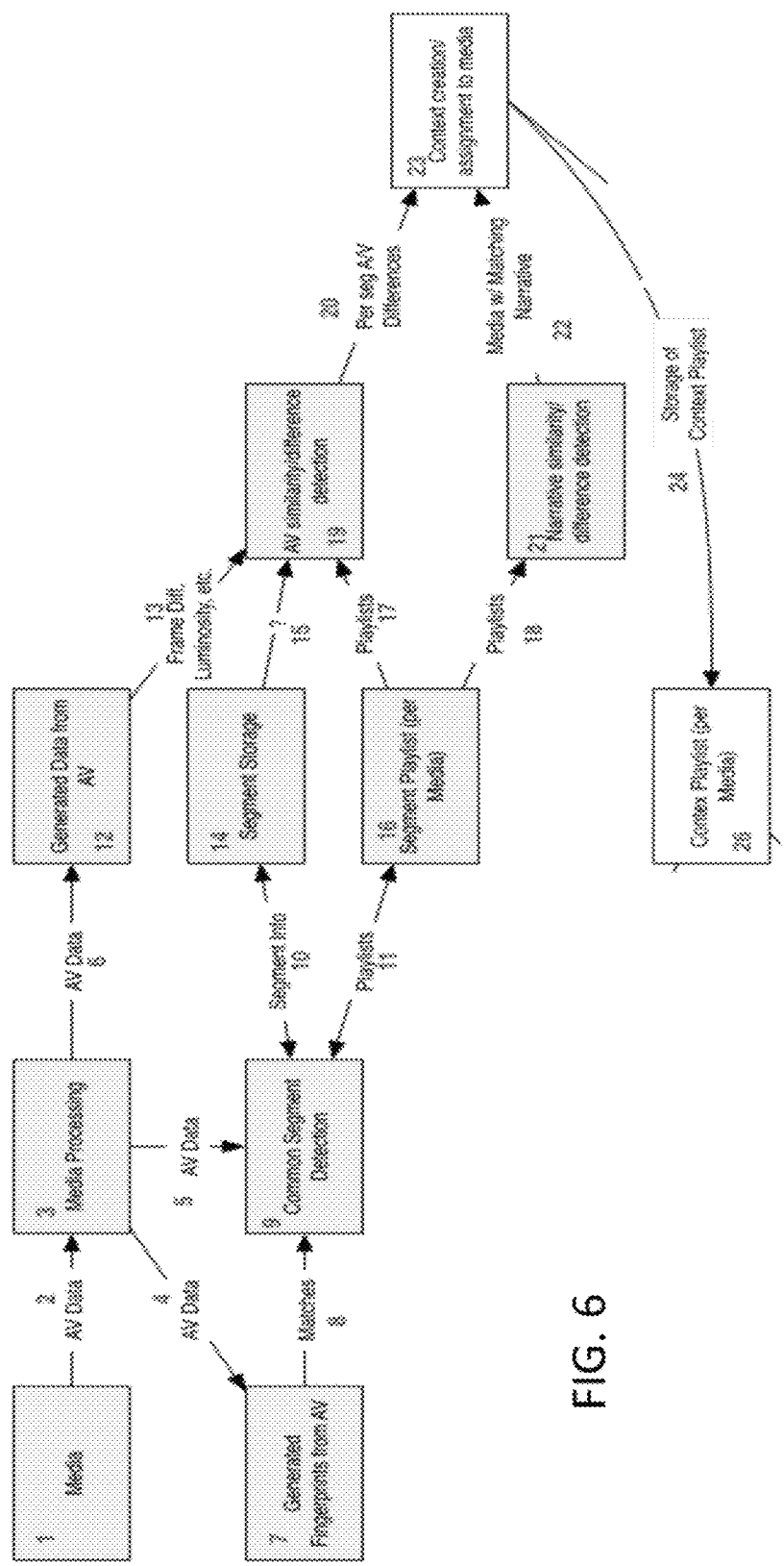
FIG. 6 illustrates an overview flowchart for a process for metadata management and delivery in accordance with at least one of the various embodiments.

FIG. 6 illustrates component/flow hybrid diagram for a process and logical architecture for in accordance with at least one of the various embodiments. As shown in the flow chart, various embodiments can be characterized in terms of three main processes: adding media data to the system, adding temporal data to the system, and querying the system for temporal data. Embodiments herein are configured to work with the systems and methods described in, for example, U.S. application Ser. No. Unassigned, entitled Management, Categorization, Contextualizing and Sharing of Metadata-Based Content for Media filed on Dec. 31, 2014 concurrently herewith by the same Applicant, OpenTV, Inc, the entirety of which is incorporated by reference hereby.

At block 1, in at least one of the various embodiments, media data from raw media signals are added to the system by extracting and sending signature data as shown at path 2, for example audio and video data, for media processing at block 3, which passes the audio-visual (AV) data via paths 4, path 5 and path 6 for processing as described below.

At block 7 the media data, for instance audio-visual (AV) data shown at path 4, is used to generate signatures, for example audio or visual fingerprints or both. The system employs ACR to determine if the signature matches signatures in the signature database 401, and as shown in path 5 sends them to the common segment detector 316. At block 9 the common segment detector 316 detects common segments as described below. As shown at path 10 in at least one of the various embodiments, the common segment detector 310 accesses segment information creates and/or edits segments stored in the segment database 404, and as shown at path 11 the common segment detector 316 system accesses and edits media playlists, which at block 6 are stored on a per-media item basis in the media playlist database 407.

FIGS. 7A-7F illustrate an exemplary process for common segment detection and creation in accordance with at least one of the various embodiments and as described in, for example, U.S. application Ser. No. Unassigned, entitled Management, Categorization, Contextualizing and Sharing of Metadata-Based Content for Media filed on Dec. 31, 2014 concurrently herewith by the same Applicant, OpenTV, Inc, the entirety of which is incorporated by references hereby. As described above each piece of media needs to be processed and added to the system. In at least one embodiment, each item of media is processed so as to create a new entry in the media playlist database and any new segments in the segment database.

Figure 7A:
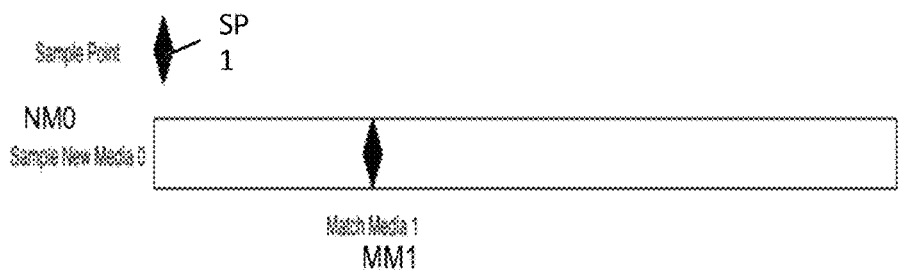
FIGS. 7A-7F illustrates a flowchart for a process for common segment detection and creation in accordance with at least one of the various embodiments.

In FIG. 7A, the process starts with the common segment detector 316 sampling a signature for a new media item and then comparing the signature sample SP1 of the new media item NM0 against the signature database to identify at least one segment in common with a matching media item signature MM1. In an embodiment, the signature database is an ACR database with ACR audio fingerprints, although in another embodiment, the database could include other signature data, for example video fingerprints for both audio and video fingerprints. Accordingly, at FIG. 7A the system is configured to sample the new media and using the ACR database to detect other media that match the sample of the ACR fingerprint.

Once the system compares the signature sample SP1 of the new media NM0 item against the signature database to identify segments in common with a matching media item signature, the comparison produces a shared segments list, with the list times in each media. In an embodiment, an identified segment ID:1 lists as a match the following exemplary shared segments list:

Media:1, start:0:00, end:5:00, Media:New, start:20:00, end:25:00.

Figure 7B:
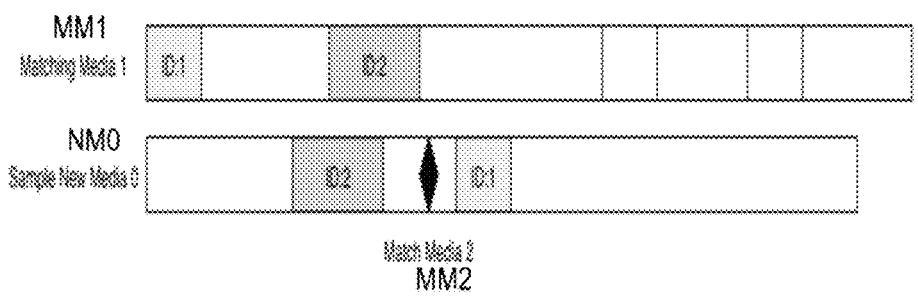

Next, as shown in FIG. 7B, the process comprises retrieving a matching media playlist MM1, which includes one or more previously identified segments ID:1, ID:2. The one or more identified segment IDs are assigned or mapped to the times where they are used in the signature of the new media NM0, in this case the ACR fingerprint of NM0, in a segment list for the new media item. The segment list for the new media item NM0 comprises a list of segment IDs for existing segment as identified in the first matching media item MM1, and includes the following information:

ID:?, ID:2 (10:00-18:00), ID:?, ID:1 (20:00-25:00), ID:?

Thus existing segment IDs are assigned to the times where they are used in a media playlist for the new media.

In the exemplary embodiment of FIG. 7B, the system is configured to sample signature data corresponding to at least one unidentified segment in the media playlist for the new media item. The system is configured to sample the media signature corresponding to one of the remaining unknown segments and find other matching media via the ACR database, for example an ACR Database of audio fingerprints. As shown in FIG. 7B, a sample is taken corresponding to an unmatched segment that occurs between identified segment ID:2 and identified segment ID:1, although as will be appreciated, any unknown segment of the segment list can be sampled. The system then performs another iteration of the process as the sampled data is compared to the signature database and matched with a second matched media item MM2.

Figure 7C:
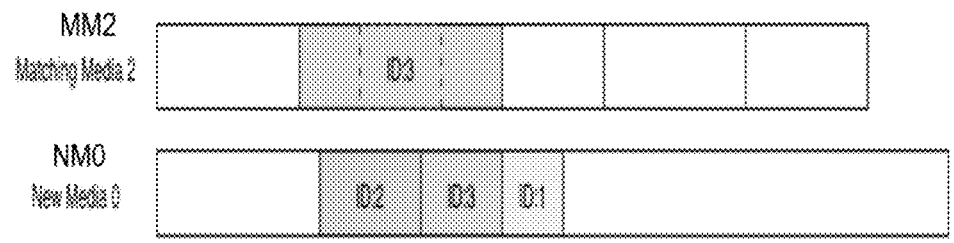

As shown a FIG. 7C, the one or more identified segment IDs from MM2 are assigned or mapped to the times where they are used in the signature of the new media NM0 in the segment list for the new media item. The segment list for the new media item NM0 comprises a list of segment IDs for existing segment as identified in the first matching media item MM1 and second matching media item MM2, and the segment list includes the following information:

ID:?, ID:2 (10:00-18:00), ID:3 (18:00-20:00), ID:1 (20:00-25:00), ID:?

The identified signature data in the new media item NM0 corresponding to ID:3 in the second matching media item 2 is shorter in duration than the corresponding previously identified segment from the second matching media item.

Figure 7D:
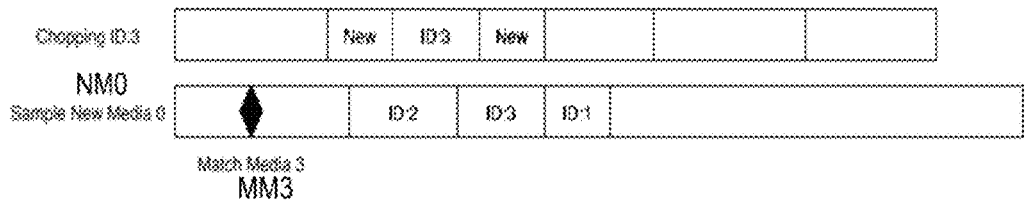

When a segment matches a smaller segment of an existing segment, then the existing segment needs to be divided. As shown in FIG. 7D, the segment ID:3 of the second matched media item MM2 is divided into one or more additional new segments. In the example, the ACR comparison mapped a small segment of the new media into a larger existing segment ID:3 of the second matched media item MM2. The existing segment ID:3 is chopped so that segments are always fully used by all media in which they are present. New segments are added to the Segment DB. The system then performs another iteration of the process as another portion of the signature data for the new media item NM0 corresponding to an unidentified segment is sampled, compared to the signature database and matched with a third matched media item MM3.

Figure 7E:
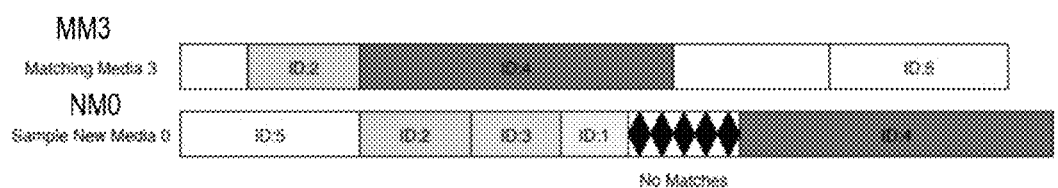
Figure 7F:
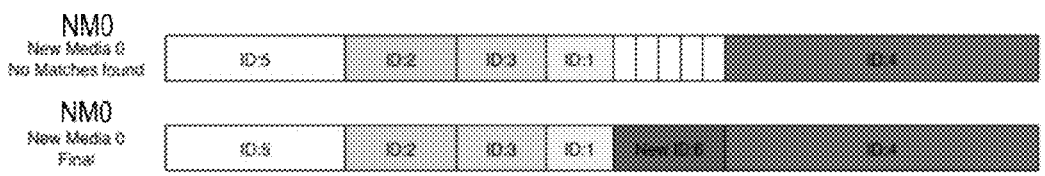

As shown in FIG. 7E, the process repeats until all matches are found and any unidentified segments will be tested enough for the system to be satisfied that the segment is truly new to the segment database. For example, as shown in FIG. 7E, matches are found in a third matching media item MM3 for segments ID:4 and ID:5, which are mapped to the segments in the new media item NM0 at the relevant times for the sections. If no more matches are found after the repeated iterations and the new media item NM still includes unidentified segments, the system determines that the new media item NM0 includes segments that are new to the Segment Database. Any segment for which no matches were found in the signature database is given a new segment ID. For example, as shown in FIG. 7F, the unidentified segment of the new media item is assigned a new segment ID:6. The new segment ID:6 is added to the Segment DB with a normalized start and end time. The final new media item NM0 can then be added to the Media Playlist Database as a new media playlist NMF. For example, the segment list for the new media playlist NMF shown in FIG. 7F can be:

ID:5 (0:00-10:00),
ID:2 (10:00-18:00),
ID:3 (18:00-20:00),
ID:1 (20:00-25:00),
ID:6 (25:00-33:00), and
ID:4 (33:00-51:00).

Figure 8A:
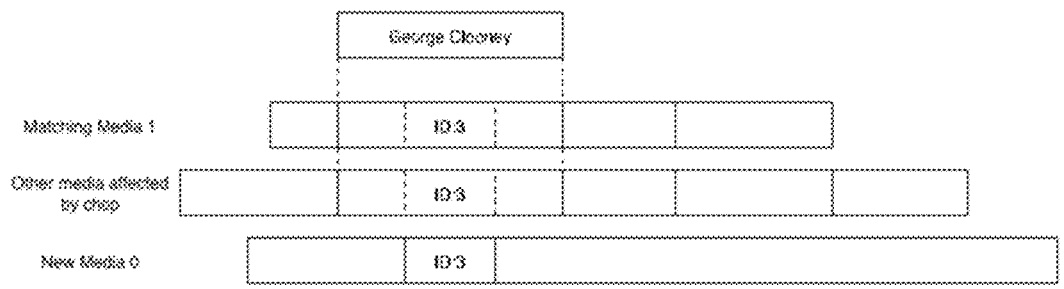
FIGS. 8A-8C illustrates a flowchart for a process for segment division in conjunction with common segment detection in accordance with at least one of the various embodiments.
Figure 8B:
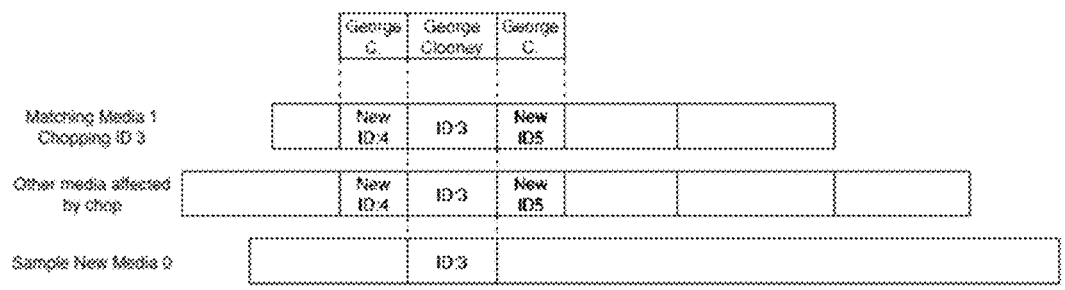
Figure 8C:
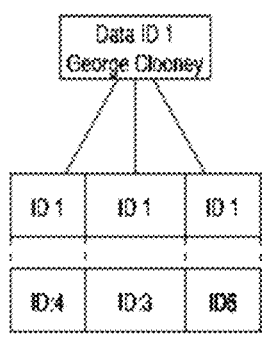

As noted above with respect to FIGS. 7C-7D, previously identified segments can be divided in the process of identifying and segmenting new media items. Dividing a previously identified segment can affect other media in the system that includes the same segments. The division also affects data that has been associated with the segments. For example, as shown in FIG. 8A, the segment ID:3 may be associated with specific metadata, for instance, George Clooney's presence in a movie scene. Two other media items, for example two media playlists representing two different versions of that same movie, can be in the system and use segment ID:3. A new piece of media is added NM0, which only uses a portion of the segment. The system chops ID:3 into three smaller segments. Any media playlist that uses these segments will also need to be configured to use the new segments. As such, any data associated with the original segment can be split across the new segments as shown in FIG. 8B. Splitting the metadata can include data replication; however splitting metadata can be accomplished by other operations. For example, adding a layer of indirection to allow the overhead of the division to be minimal and avoid incongruities when the data needs to be updated, as illustrated in FIG. 8C.

Figure 9:
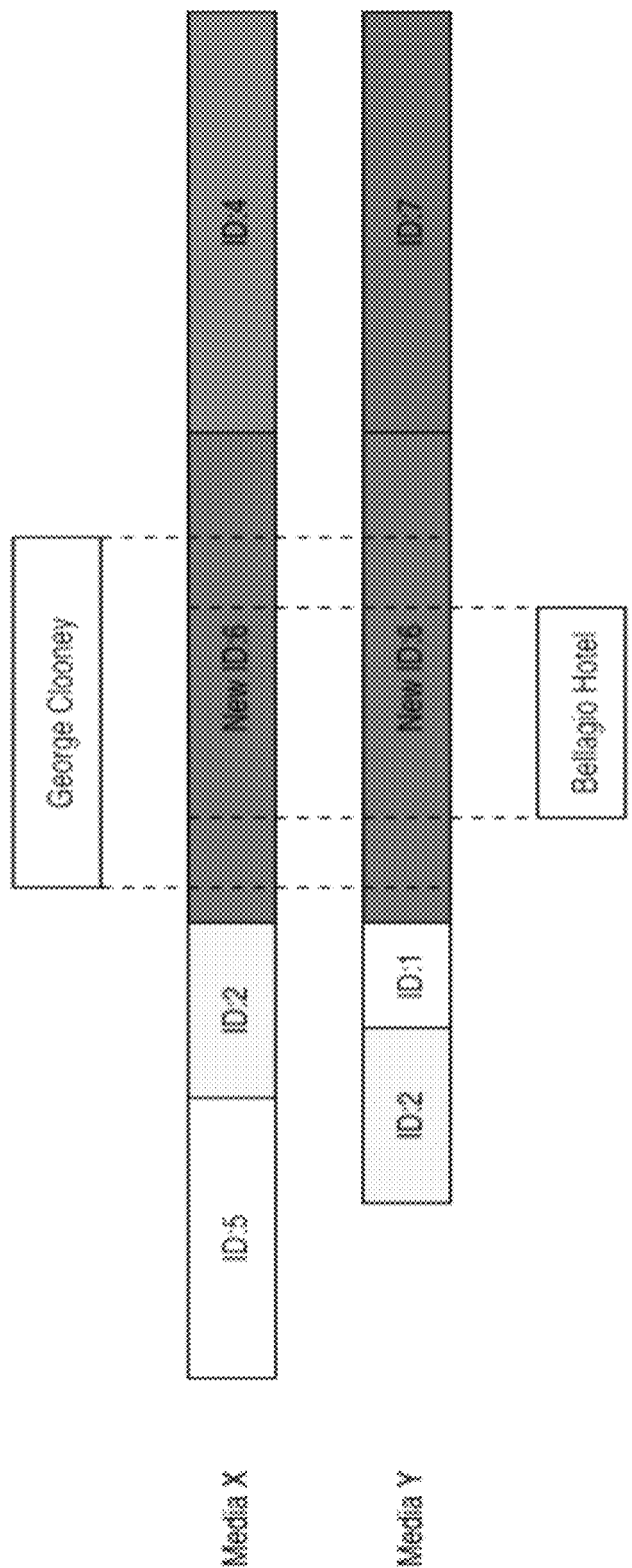
FIG. 9 illustrates media playlists including shared segments and contexts for metadata in accord with at least one of the various embodiments.

Once all the media has been segmented and a database of shared segments has been created, then data can be associated with a moment or duration within one media and instantly shared with all other media via the segments. The shared data is stored in the metadata database, where each media item has its own media playlist, each playlist including segments, including shared segments as identified above. For example, as shown in FIG. 9, for media playlist X and media playlist Y, the system has determined they both share segment ID:6. Segment ID:6 includes metadata corresponding to the moment within segment ID:6 where George Clooney first appears on screen is at the same point for media X and Y. As such, data can be added when only one piece of media is available with which to reference the data. Data can also be readily retrieved since each media item has a unique media playlist comprising the segments. Each media playlist references a specific list of segments, and each segment includes a segment ID as well as the start and end times relative to this piece of media. The segments and media playlists can then be associated with metadata in the metadata database, for example via an associations database that correlates the Segment IDs and times to specific metadata.

As such, when an end user plays a piece of media on a media device, the playback time can be used to locate the segment that starts before the playback time and ends after the playback time. An offset can be calculated into the block as well to allow for time to access anticipated metadata. The system can then return any data from the metadata database associated with the segment and the playback offset into the segment.

As will be appreciated, the same process can be used with audio and/or video based ACR or other signature or fingerprint obtaining methods. If both are used, then in various embodiments the system can include an audio segment list and a video segment list for each piece of media.

Accordingly, embodiments as described herein enable the system to relate a piece of media to other relevant media data in a library. As described above, media can be mapped into common/uncommon segments along with a segment list for each media item, i.e. a media playlist. In embodiments, data for each common segment can be added to indicate if a shared segment shares audio, video, or both. This allows the system to share temporal data with other media and identify how one piece of media relates to another. However not all temporal data should be shared with other related media. For example, some data in a segment can related only to audio (e.g., song info), while some data can be associated only with the video (actor/character on screen), and other data may be for a specific narrative (movie or documentary about a movie). A common/shared segment may even be reused in the same narrative, so the narrative data may be different each time the segment appears. The system can thus be configured to include associate context data with media playlist and segments.

Returning to FIG. 6, at block 19 media playlists and video signatures are derived via a video context detector employing, for example, frame differentials or luminosity as shown at path 13 to detect AV similarities/differences per segment in the new media, the process for which is described below. At block 21, narrative context detectors access media playlists as shown at path 19 to detect media with the same narrative, the process for which is described in below.

As shown at path 22, lists of media with the same narrative as identified at block 21 and at block 20 per segment AV differences detected at block 19 are passed to a context creation and assignment module 320. At block 23, the system is configured create content and assign to media by receiving the per segment AV differences detected at block 19 by the video difference detector along with a list of media with the same narrative as identified at block 21 via the narrative context detector and determine if existing contexts can be used (per segment) or to create new context categories as shown at path 25. In various embodiments, each segment of a media item will be assigned one or more contexts-per-segment in the media item's media playlist, which at path 24 is stored as a context playlist for the media playlist. At block 26 the system is configured to associate the contexts used by each segment such that contexts may be shared by other media in their relevant context playlist for the media playlist as described herein.

Figure 10B:
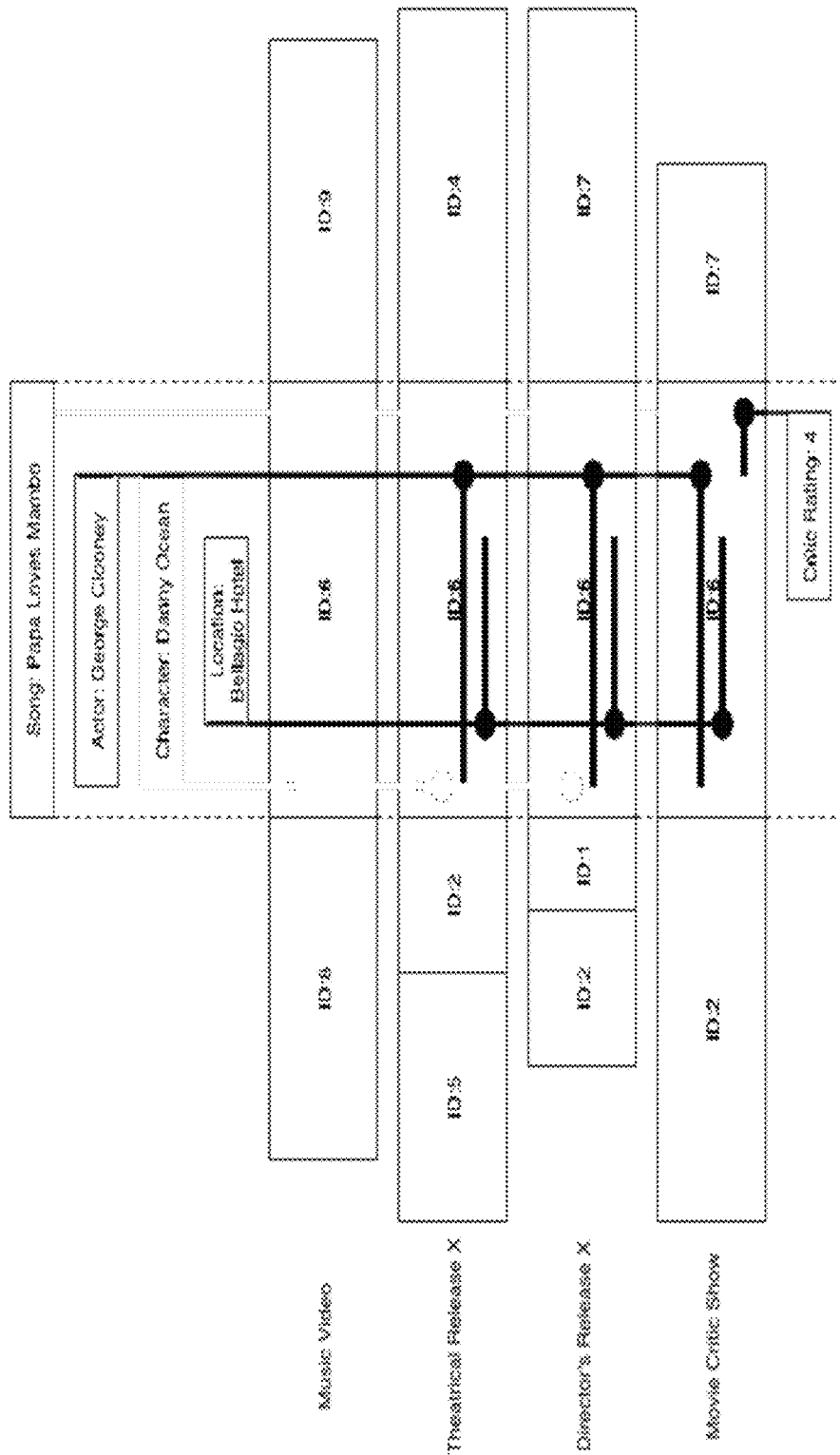

FIG. 10B is an illustration of an example of different context categories for a shared segment. As shown in the exemplary illustration, four media playlists can all include a common segment ID:6. The width of the blocks indicates duration of the segment. This diagram shows exemplary basic scenarios that can arise when sharing data or otherwise correlating media playlists using common segments. In the embodiment, the system identifies common segments determined by audio matching (e.g. ACR) as described herein. Five pieces of data have been associated with segment ID:6: a song "Papa Loves Mambo," an actor "George Clooney," a character "Danny Ocean," a location "the Bellagio Hotel." and a critic rating: "4." In the example:

- the song info applies to all four pieces of media, as the common segment is based on audio matching;
- the actor data does not apply to the music video because the actor is not on the screen;
- the character info only applies to the media that share the narrative of movie X;
- the location data applies to all contexts but the music video, since the video is different in the music video.
- The critic rating data only applies to the movie critic show's narrative.

In embodiments, the system is configured to build and track the various contexts to which metadata can be applied relative to each piece of media. Metadata can then be categorized by context upon input to the system. Some examples of the contexts may include: audio context, video context, and narrative context. In embodiments, metadata can be shared by sharing contexts. At any given moment, the system can allow a piece of media having multiple contexts to be merged when extracting the metadata for that moment.

For example, an audio context can be shared by two or more pieces of media if they share the same audio. Any data added to this context pertains to the audio and therefore applies to all media that use this context. A piece of data can be associated with an audio context, for example, "Song: Papa Loves Mambo" as shown in FIG. 10B video context can also be shared if the media share the same video. Any data added to this context pertains to the video and therefore can apply to all media that use this context. A piece of data can be associated with a video context, for example, "Location: Bellagio Hotel" as shown in FIG. 10B. A narrative context can also be shared if the media share the same narrative. Any data added to this context pertains to the narrative of the media and therefore applies to all media that have the same narrative. A piece of data can be associated with a narrative context: "Character: Danny Ocean" as shown in FIG. 10B.

Context creation and assignment to media items at block 23 of FIG. 6 takes place when adding metadata for a media item to the system. In embodiments, the media context categories for segments can include, for example, an audio context, a video context, and a narrative context. An audio context can be shared by multiple media items if they share the same audio. For example, a plurality of media playlists for a respective plurality of media items can share the same audio, and can have a shared segment as descried herein. Any data added to the audio context category for the shared segment can thus apply to all media that share the audio context, e.g. via the shared segment.

Accordingly, in various embodiments, the system is configured to categorize the relationships between media into categories. Table 1 shows of a list of exemplary categories for categorizing the relationships between media by segment matching.

As shown in Table 1, the first relationship category is a 100% match of audio segments of a new media item with audio segments of media stored in a system database/library, for example the segment database and the media playlist database. A full match indicates the media playlist is for the same media item. The second relationship category for no match of the audio segments for the new media with and stored audio segments, thus the media item has no relationship with any previously identified media.

The third relationship category is for media playlists where a substantial amount of common segments are arranged in substantially the same order. The lengths of the audio segments between the new media item media playlist and the previously identified media playlist are also substantially the same, although there can be small differences. This indicates the new media item is either a condensed or expanded alternative version of the media item corresponding to the previously stored media playlist.

The fourth relationship category is for a substantial amount of common segments in the media playlists, but most of the segments are not in the same time order. Again the lengths of the audio segments between the new media item and the stored audio segments are also substantially the same, although there can be small differences. This indicates that new media item is either a condensed or expanded mixed alternative version of the media item corresponding to the previously stored media playlist.

The fifth relationship category is for a substantial amount of common segments and arranged in substantially the same order in, for example, a media playlist, but the lengths of the media items differ substantially. This indicates that new media item is either a condensed or expanded cut of the media item corresponding to the previously stored media playlist.

The sixth relationship category is for a substantial amount of the common segments between the new media and the media playlist in the database are not in the same order and the lengths of the media items differ substantially. This indicates that new media item is either a condensed or expanded mixed cut of the media item corresponding to the previously stored media playlist.

The seventh category indicates that are only a few common segments between the new media and the previously identified media playlist in the database, and the few common segments are arranged in the same order. This indicates that new media item is a sample of or by the media item corresponding to the previously stored media playlist.

The eighth category indicates that there are only a few common segments between the new media item and the previously identified media playlist, and most of the common segments are not in the same order. This indicates that new media item is a mixed sample of or by the media item corresponding to the previously stored media playlist.

TABLE 1

| | Relationship Category | Description |
|---|---|---|
| 1 | FULL_MATCH_WITH/ FULL_MATCH_WITH (symmetric) | 100% match |
| 2 | NO_MATCH_WITH/ NO_MATCH_WITH (symmetric) | 0% Match |
| 3 | CONDENSED_ALTERNATE_VERSION_OF/ EXPANDED_ALTERNATE_VERSION_OF | Substantial amount of common segments and most are in the same order. Lengths are different, but not drastically different. |
| 4 | CONDENSED_MIXED_ALTERNATE_VERSION_OF/ EXPANDED_MIXED_ALTERNATE_VERSION_OF | Substantial amount of common segments and most are not in the same order. Lengths are different, but not drastically different. |
| 5 | CONDENSED_CUT_OF/ EXPANDED_CUT_OF | Substantial amount of common segments and most are in the same order. Lengths are drastically different. |
| 6 | CONDENSED_MIXED_CUT_OF/ EXPANDED_MIXED_CUT_OF | Substantial amount of common segments and most are not in the same order. Lengths are drastically different. |
| 7 | SAMPLES_FROM/ SAMPLED_BY | Small amount of common segments and most are in the same order. |
| 8 | MIXED_SAMPLES_FROM/ MIXED_SAMPLED_BY | Small amount of common segments and most are not in the same order. |

Categorizing media relationships is associated with synchronizing information about media (e.g. movies, TV shows, music, podcast, web video, etc.) with media playback so that contextual and temporal relevant data can be displayed at appropriate times during playback. For example, while a movie is reproduced, ancillary narrative information about an actor in the movie can be displayed, as described in, for example, U.S. application Ser. No. Unassigned, entitled Lull Management for Content Delivery filed on Dec. 31, 2014 concurrently herewith by the same Applicant, OpenTV, Inc., the entirety of which is incorporated by reference hereby. In various embodiments, the system is configured to automatically determine the relationships between a new media item and media previously stored in a library or database, for example in the segment database and media playlist database.

In various embodiments, the system comprises a narrative context detector configured to categorize directional relationships between media items using, inter alia context detection algorithms. For example, in an embodiment, the context detection algorithm can be a difference detection algorithm including algorithms known in the art such as a Levenshtein Edit Distance Algorithm. A Levenshtein distance is a string metric for measuring the difference between two sequences. A Levenshtein distance between two words can be characterized as the minimum number of single-character edits (i.e. insertions, deletions or substitutions) required to change one word into the other. For example, Levenshtein distance between "mitten" and "knitting" is 4, since the following three edits change one into the other:

1. mitten→nitten (substitution of "n" for "m")
2. nitten→nitten (substitution of "i" for "e")
3. nitting→knittin (insertion of "k" at beginning)
4. knittin→knitting (insertion of "g" at the end).

In various embodiments, narrative relationships between related media items can include: "Sampled From," "Extended Version," "Shortened Version," "Mixed Sampled," "Condensed Alternative Version," "Alternative Ending Version," and so on.

The system can include a narrative context detector that can identify and categorize the relationship between a new media item and previously identified media. In an embodiment, the system is configured to employ signature detection for example, by sampling the new media to obtain a fingerprint, and then match the samples using, for example, ACR to identity a similar media items stored in a signature database and then identify common segments in a segment database as described above. The system can then apply a narrative context detection algorithm, for example a modified string edit distance algorithm as described herein, to identify similarities and capture complex relationships between the media items for the segments. The system is then configured to categorize the relationships between the media items and other information using the narrative context detection algorithm. Embodiments are described in more detail as follows.

Sample the New Media According to a Pre-Determined Sampling Frequency.

In an embodiment, the system is configured with a similarity sample rate for how often the new media will be tested for similarities. For example, a sample rate of five seconds would indicate that every five seconds the audio and/or video should be sampled. Any similarity or difference that lies completely between samples will not be detected. Thus the sample rate is configured to capture a desired degree of accuracy. As will be appreciated, sample durations can overlap where a sampling frequency is small.

Match the Samples Using ACR to Identify Media with Similarities to the Media being Sampled In an embodiment, the system is configured to employ signature detection to match the samples. For example, samples can be fed into an ACR system and compared against a signature database such as an ACR database. All media matches can then be collected into a match set or media playlist. In various embodiments the system is configured to use the match set to determine a media relationship between media items. For example, the ACR match set can indicate that the new media has no matching (<NO_MATCH_WITH>) relationship to all media not in the match set. This could be represented implicitly by not storing any relationship for the <NO_MATCH_WITH> narrative context for a media item.

Figure 11:
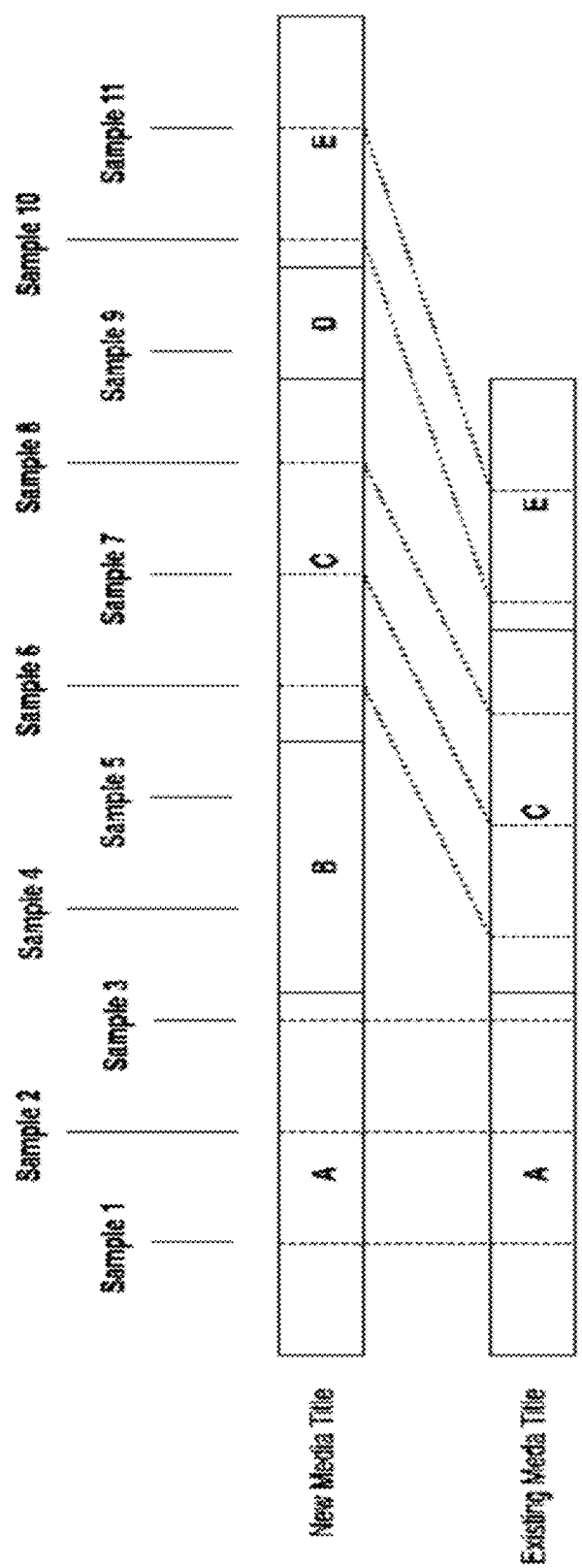
FIG. 11 illustrates an example of multiple pieces of media containing the same audio segment of a song.

FIG. 11 illustrates an example showing how samples at different points in a new piece of media may match another piece of media in the system. The new media NM is sampled to produce 11 samples S1, S2, S3, S4, S5, S6, S7, S8, S9, S10, S11. As shown in FIG. 11, ACR recognition identifies eight matches that appear in both media playlists, sample S1, sample S2, sample S3, sample S6, sample S7, sample S8, sample S10 and sample S11.

Compare the New Media to Each Identified Existing Media to Determine the Common Segments.

As noted herein, existing signature comparison techniques can be used to compare the new media to each piece of media in the match set, for example using ACR fingerprint comparison techniques as described herein. However direct video and audio comparison could be employed as well. The system can then compare the ACR fingerprints from the new media item and the one from the matching media item run a context detector such as an ACR algorithm on the ACR fingerprints to identify exact start and end times for the common portions of the ACR fingerprints. Next, the common portions can be compared to a media playlist to map them to identified segments in the segment database. The segments can then be added a new media playlist including the common portions.

For example, as shown in FIG. 11, new media NM can have segments A, B, C, D and E. The existing media EM can be identified via the segment database as described herein as having segments A, C and E. Three of the matches, sample S1, sample S2 and sample S3 are from common segment A. In common segment C there are three sample matches: sample S6, sample S7, and sample S8. In segment E, two matches were found with Media B. In segments B and D, which are not in the existing media's EM media playlist or sequence of segments; there are no sample matches. Accordingly, the comparison can produce a sequence of shared segments for each previously identified matching media item relative to the new media.

Figure 12A:
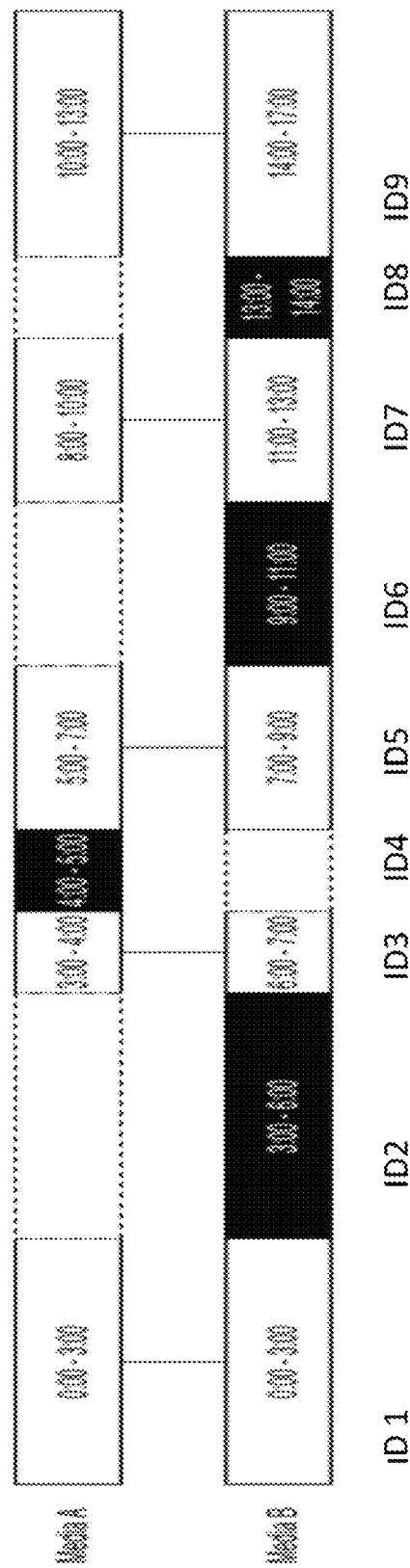
FIGS. 12A-12C illustrate embodiments of narrative context detection.

FIG. 12A is a graphic representing common segments for media playlists A and B. Segments can be created and stored in a segment database and segment lists for media items can be stored in a media playlist database as described herein, although in embodiments common segments can be determined and ordered in segment playlists in other ways as well. Each segment can have a normalized time as described herein, but can have a start and end time corresponding to different times in the media items. As shown in the illustrative example, Segment ID1 is from 0:00 to 3:00 minutes in both Media A and Media B. Segment ID3 is from 3:00 to 4:00 minutes in Media A and from 6:00 to 7:00 minutes in Media B. Segment ID5 is from 5:00 to 7:00 in Media A and from 7:00 to 9:00 in Media B. Segment ID7 is from 8:00 to 10:00 minutes in Media A and from 11:00 to 13:00 minutes in Media B. Lastly, segment ID9 is from 10:00 to 13:00 minutes in Media A and from 14:00 to 17:00 in Media B. FIG. 12A also shows unmatched segments. In particular, segments ID2, ID6 and ID8 at times 3:00 to 6:00, 9:00 to 11:00, and 13:00 to 14:00 respectively have no corresponding match in Media A. Similarly, segment ID4 at 4:00 to 5:00 in Media A has no common segment in Media B.

In various embodiments the system is configured to include context detectors to analyse the common segments for the media playlists for each media to generate metrics that describe the similarities.

Apply Modified String Edit Distance to Similarities in Order to Capture Complex Relationships in a Metric.

For example, in an embodiment a narrative context detector can include a modified string edit distance algorithm can be used to evaluate how similar the two pieces of media are. String edit distance algorithms calculate the cost of editing one string until it matches another. Each edit can have a weight associated with it. In various embodiments, a narrative context detector comprises a modified string edit distance algorithm which has been configured to be applied to media items by, for example, converting the media item input or modifying the algorithm itself. Examples of various embodiments of narrative context detection are illustrated in FIG. 12B and FIG. 12C.

Figure 12B:
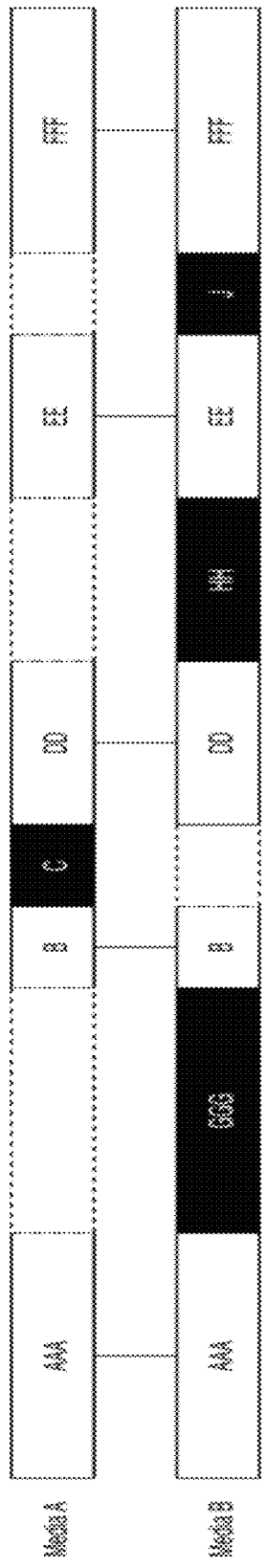
Figure 12C:
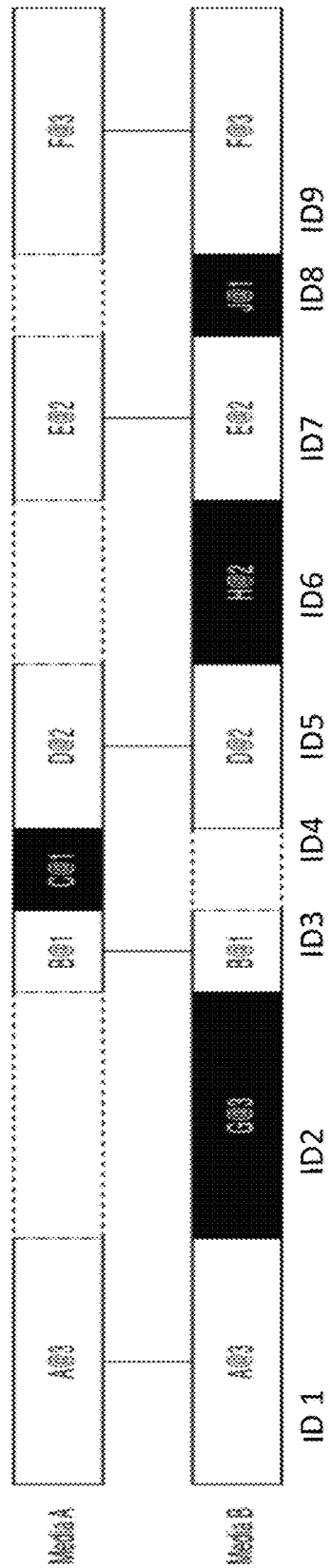

In an embodiment, as illustrated in FIG. 12B, media data can be adapted to be analysed by a Levenshtein Edit Distance Algorithm by adapting the data to a string as follows:

Equate symbols to a fixed time, for example, 1 second;
equate matches to blocks of symbols to match the time, for example having a 10 second match=AAAAAAAAAA; and
run the Levenshtein Edit Distance algorithm.

For example, referring to the media playlists from FIG. 12A, as shown in FIG. 12B the segments are converted such that each symbol is equated to a minute:

Segment ID1 AAA
Segment ID2 GGG
Segment ID3 B
Segment ID4 C
Segment ID5 DD
Segment ID6 HH
Segment ID7 EE
Segment ID8 J
Segment ID9 FFF.

The media playlists can then have values AAABCDDE-EFFF for Media A and AAAGGGBDDHHEEJFFF for Media B, which can be analysed by the Levenshtein Edit Distance algorithm for, inter alia, narrative context categorization as described herein.

In other embodiments, as illustrated in FIG. 12C, a narrative context detector can employ Levenshtein Edit Distance Algorithm with modification for symbol weights. For example, in one embodiment, the algorithm is modified as follows:

Equate matching blocks or common segments to symbols with weight equal to time, for example 5 seconds=A @ 5 weight. For example, referring to the media playlists from FIG. 12A, the segments are converted such that each symbol is equated to a minute:
Segment ID1 A@3
Segment ID2 G@3
Segment ID3 B@1
Segment ID4 C@1
Segment ID5 D@2
Segment ID6 H@2
Segment ID7 E@2
Segment ID8 J@1
Segment ID9 F@3.

The media playlists can then have the values as follows: Media A: (A weight 3), (B weight 1), (C weight 1), (D weight 2), (E weight 2), (F weight 3), Media B: (A weight 3), (G weight 3), (B weight 1), (D weight 2), (H weight 2), (E weight 2), (J weight 1), (F weight 3).

In one embodiment, the Levenshtein Edit Distance algorithm is modified such that the "Insert" and "Remove" functions of the algorithm to have a cost equal to the weight of the symbol and the "Swap" function of the algorithm is modified to have a cost equal to the average weight of the two symbols being swapped. The Levenshtein Edit Distance algorithm thus modified can then be run to analyse the media playlists.

In another embodiment, a narrative context detector can employ a modified generic string edit distance algorithm as follows:

As shown and described above with respect to FIG. 12C, equate the segments to symbols with weight equal to time, for example 5 seconds=A @ 5 weight;
edit the actions: Add/Remove/Move;
edit the costs equal to weight of symbol;
find the longest contiguous/non-contiguous sequence of symbols with highest weight (minimize moves); and
run the algorithm to "Remove" any extra non-shared symbols, "Move" any remaining out-of-order symbols (not part of longest sequence), and "Add" any non-shared symbols from the second string.

Categorize the Relationships

The narrative context detector can now categorize the media items based on the information calculated by the narrative context detection algorithms. For example, a set of edit distance thresholds can be employed, or in various embodiments, the system can be configured to employ more precise categorization functions where additional information is used to create more precise categories.

Two exemplary functions to determine differences between two media are:
(a) longestPercentageInOrder(A,B), which finds the longest sequence of in order segments and returns it as a percentage of the longer piece of media; and
(b) percentageInCommon(A,B)—which, finds all common segments between the two pieces of media, and returns it as a percentage of the longer piece of media.
An exemplary embodiment of an algorithm employing these functions to categorize media item relationships in accord with, for example, the relationship categories shown in Table 1 can include:

```
// returns the category of the relationship that A has to B
category categorizeRelation(Media A, Media B) {
    Media A;
    Media B;
    bool swapped = false;
    // make A the longer piece of media
    if( duration(A) < duration(B) ) {
        swap(A,B);
        swapped = true;
    }
    float editDistance = computeEditDistance(A,B); // 0-100
    if ( editDistance < 1 ) {
        return category::FULL_MATCH_WITH;
    }
    if ( editDistance > 99 ) {
        return category::NO_MATCH_WITH;
    }
    // split on edit distance
    if ( editDistance > 50 ) {
        if ( duration(B) > 0.5 * duration(A) ) {
            // Alternate version detected
            if ( longestPercentageInOrder(A,B) /
percentageInCommon(A,B) >= 50 ) {
                if (swapped) {
                    return
category::CONDENSED_ALTERNATE_VERSION_OF;
                } else {
                    return
category::EXPANDED_ALTERNATE_VERSION_OF;
                }
            } else {
                if (swapped) {
                    return
category::CONDENSED_MIXED_ALTERNATE_VERSION_OF;
                } else {
                    return
category::EXPANDED_MIXED_ALTERNATE_VERSION_OF;
                }
            }
        } else {
            // Cut detected
            if ( longestPercentageInOrder(A,B) /
percentageInCommon(A,B) >= 50 ) {
                if (swapped) {
                    return
category::CONDENSED_CUT_OF;
                } else {
                    return
category::EXPANDED_CUT_OF;
                }
            } else {
                if (swapped) {
                    return
category::CONDENSED_MIXED_CUT_OF;
                } else {
                    return
category::EXPANDED_MIXED_CUT_OF;
                }
            }
        }
    } else {
        // Sample detected
        if ( longestPercentageInOrder(A,B) / percentageInCommon(A,B)
>= 50 ) {
            if (swapped) {
                return category::SAMPLES_FROM;
            } else {
                return category::SAMPLED_BY;
            }
        } else {
            if (swapped) {
                return category::MIXED_SAMPLES_FROM;
            } else {
                return category::MIXED_SAMPLED_BY;
            }
        }
    }
}
```

FIG. 13 shows a simplified relationship category diagram employing the categories described with respect to Table 1 herein and illustrating how many segments of media B relate to media A. The dotted lines show the category boundaries defined by the categorize Relation( ) function. The variations of B have been simplified to only use blocks that are 10% of the length of A and differences in length are restricted to 10% increments. As will be appreciated, even when simplified the domain of permutations of the variations of B are large, hence FIG. 13 has been streamlined to specific examples. Shaded blocks indicate a shared block with A. The white blocks indicate sections added to media B.

As will be appreciated, there are many different ways of slicing an input domain to create different categories for media. For example, all the alternate versions of media item may be treated the same, even though the system can categorize them into four different relationships. Also, new categories can easily be added by adjusting the way the input domain is divided. Relationship categories may be stored as property lists such as, for example: "Type: Alternate Version Of," "Mixed: Yes," and "Condensed: No." Once the relationships between media items are identified, the contexts can be stored and identified as narrative contexts for each media item.

In another embodiment, the system can be configured with video context detection to account for changes in only the video for a media item or only the audio data of a media item. For example, in a media product, sometimes new or different audio is edited on top of the same video, such as with a movie dubbed in different language than the original, or scenes of a movie where profanity is substituted with non-profane language. As will be appreciated, this can change the weighting or break down of the categories (e.g. categories for alternate foreign versions or with different MPAA ratings).

Video Context Detection

In various embodiments, a video context detector can be configured to identify video frame differences to determine if the video a media item is the same or different. For example, where only audio signatures (e.g., audio ACR) are employed to identify media, a segment that has the same audio but different video cannot be distinguished. To remove ACR ambiguity when audio is shared between media, for example when popular music or songs are use in movies, the system can be configured to sample both video and audio signature data, when ingesting movies, television shows, or content that includes videos. The system can be configured to capture additional information about the video and use this to detect that the video is different for the common segments.

In one embodiment, a video context detector employs a frame luminosity algorithm to identify video difference or similarity. Image luminosity is calculated based on image luminosity algorithms as known in the art, which produces a number that indicates the average brightness of the image. Image luminosity is performed for every frame of the video content and stored in a video context database as a sequence.

In another embodiment, a video context detector can analyse the difference between two images by employing a frame differencing algorithm as known in the art. A frame differencing algorithm compares the pixel differences between two frames. If the pixels have changed, then the frame differencing algorithm identifies that something is changing in the image, for example movement. The algorithm is applied to consecutive pairs of frames. The result can then be averaged so that each frame comparison produces a single number representing a difference between the two frames. The frame difference comparison and number is produced for every consecutive pair of frames, which can then be stored in a sequence in a video signature database. The sequence may then be associated with an existing audio or video signature, for example an audio or video ACR fingerprint.

FIG. 14 shows an example of a video context detector comparing differentials in video to determine if the video in a common segment is the same or different.

Figure 14A:
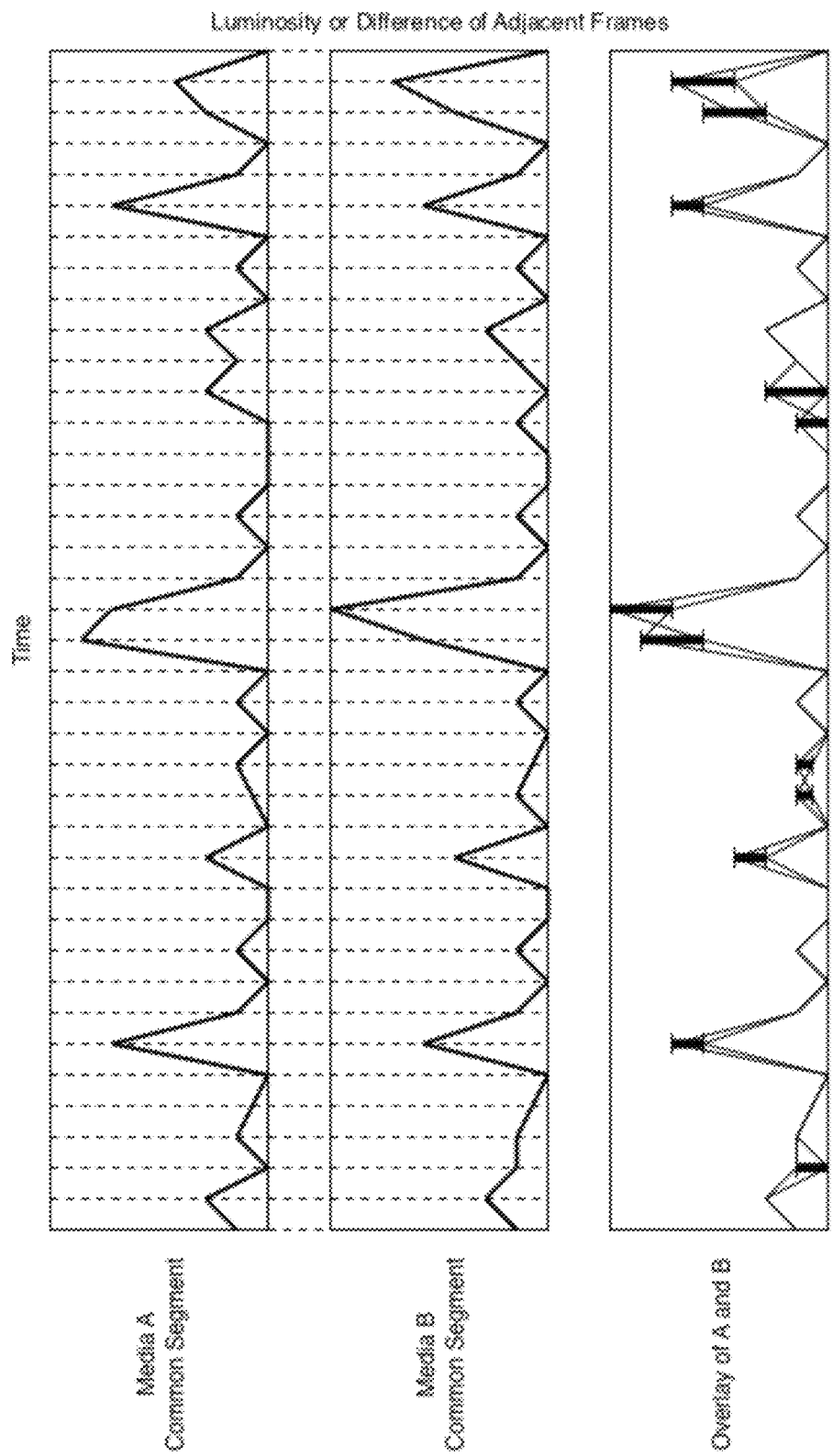
FIGS. 14A-14B illustrates a graph for video context detection.
Figure 14B:
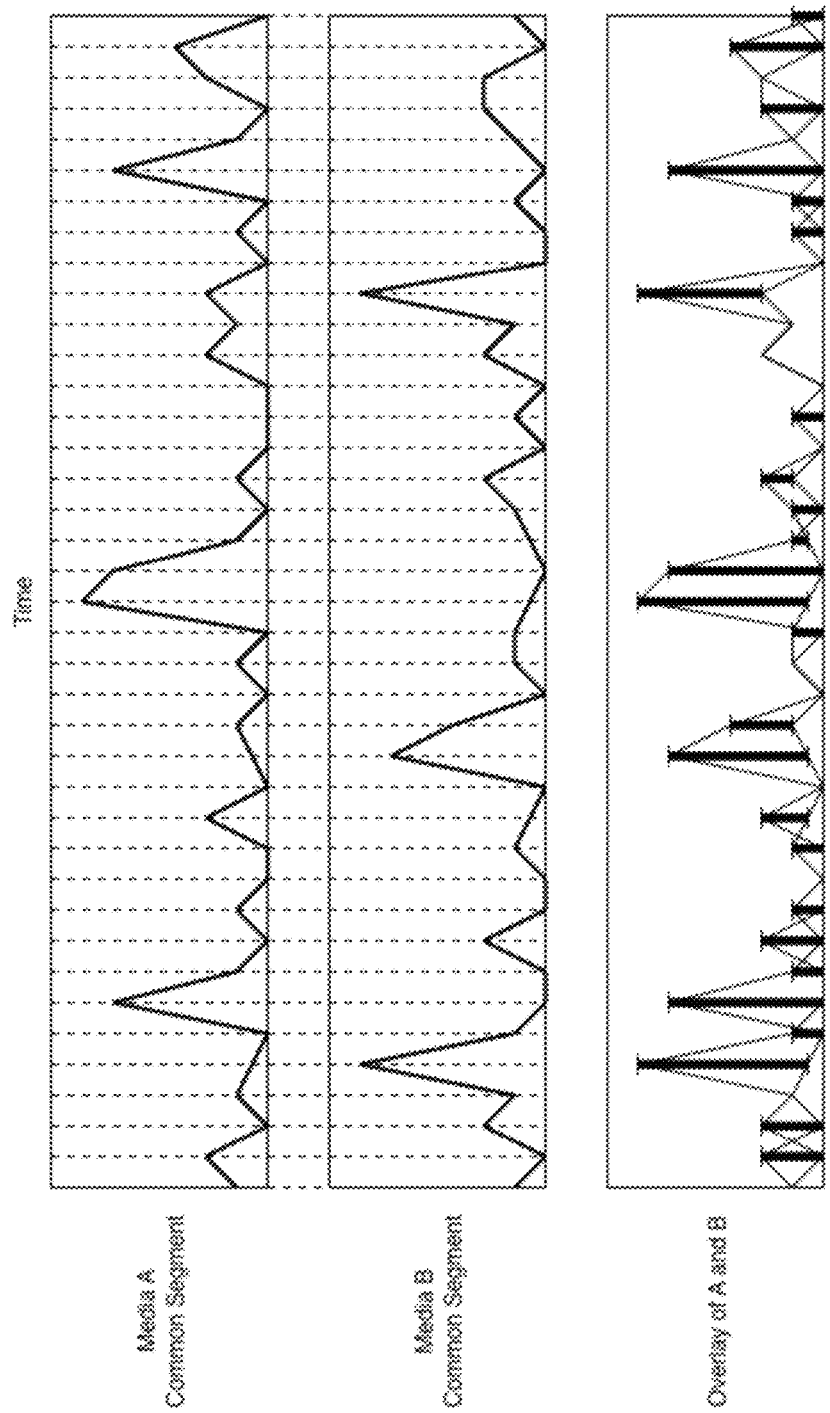

As explained herein, audio ACR can be used to find common segments between two media items, media A and media B. The video context detector can employ a luminosity algorithm or frame differential algorithm or compute the average frame luminosity or frame difference for every frame for each piece of media. The common segments can then be analyzed to determine if the video is the same in each piece of media. FIG. 14A graphs illustrating a video analysis plotted over a time axis for a common segment of media A and media B employing a luminosity algorithm or frame differential algorithm where the video is the same. An overlay of the graphed plots for media A and media B are overlaid. The luminosity or frame difference of the overlaid plots has a small absolute delta, as shown by the dark indicators I between the two plots for the video. Well known formulas can be used to calculate the error between the two data sets, such as: Mean Absolute Error, Mean Squared Error, Root Mean Squared Error, etc. The formulas will produce a low error relative to media that do not share the same video. FIG. 14B illustrates graphs where a common audio segment has different video. The overlay of the plot analysis from video luminosity or frame difference is not substantially similar. The plots in in the overlay for Media A and Media B produce high mean error, as shown in shown the dark indicators I between the two plots for the video.

The video context detector can employ a threshold to allow the system to automatically decide if the video is the same or different. For example, if at least 15% of the frames are different, then a new context can be created.

In an embodiment, the system can be configured to employ frame cropping to compare media items with video having different aspect ratios. Frame cropping can be employed to confirm that substantially the same pixels of each frame of a video are captured in different versions of the media. Some examples of different video aspect ratios are 4:3, 16:9, and letterboxing. FIGS. 15A-15C show exemplary approaches to cropping. FIG. 15A is an example of a large circular crop, which takes the largest circle centered within the frame as the crop. FIG. 15B shows an example where the video context detector takes the smallest frame size that the system expects for any given video media, for example 4:3, and centers this cropping area within the frame. FIG. 15C employs either of the canter circle crop or the smallest frame size crop against letterboxed frames by capping the height of the crop region by the height of the real frame.

It will be understood that each block, path or element of the flowchart and process illustrations, and combinations of blocks, paths, or elements in the flowchart and process illustrations, can be implemented by computer program instructions. These program instructions may be provided to a processor to produce a machine, such that the instructions, which execute on the processor, create means for implementing the actions specified in the illustrations. The computer program instructions may be executed by a processor to cause a series of operational steps to be performed by the processor to produce a computer-implemented process such that the instructions, which execute on the processor to provide steps for implementing the actions specified in the flowchart. The computer program instructions may also cause at least some of the operational steps shown in the blocks, paths or elements of the flowchart to be performed in parallel. Moreover, some of the steps may also be performed across more than one processor, such as might arise in a multi-processor computer system or even a group of multiple computer systems. In addition, one or more blocks, paths or elements, or combinations of blocks, paths or elements in the illustrations may also be performed concurrently with other blocks, paths or elements or combinations of blocks, paths or elements, or even in a different sequence than illustrated without departing from the scope or spirit of the invention.

Accordingly, blocks, paths and elements of the flowchart and process illustrations support combinations of means for performing the specified actions, combinations of steps for performing the specified actions and program instruction means for performing the specified actions. It will also be understood that each block or element of the flowchart and process illustrations, and combinations of blocks or elements in the flowchart and process illustrations, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The invention claimed is:

1. A computer system comprising:
a non-transitory computer-readable memory comprising computer executable instructions, that when executed by one or more processors, cause the one or more processors to:
receive a sample of a first media item;
compare the sample of the first media item with a signature database to identify at least a second media item based on a matching signature, wherein the signature database comprises unique signatures for each of a plurality of media items;
identify, using a first technique, one or more common segments that are common between one or more first segments in the sample of the first media item and one or more second segments in the second media item;
determine, using a second technique that is different than the first technique, for each of the one or more segments that are common, a difference for that segment between the sample of the first media item and the second media item; and
provide, for a target device, access to the second media item based on the difference for each of the one or more segments that are common between the sample of the first media item and the second media item.

2. The computer system of claim 1, wherein to identify, using the first technique, one or more segments that are common, the one or more processors are further configured to:
sample the first media item to create an audio signature sample;
compare the audio signature sample of the first media item against the signature database to identify at least one matching audio signature for the first media item;
compare common portions of the audio signature sample of the first media item and the matching audio signature to the one or more segments that are common in a segment database;
obtain additional contextual data about the first media item; and
determine if the additional contextual data is substantially similar for each segment that is common.

3. The computer system of claim 1, wherein to determine, using the second technique, a difference, the one or more processors are further configured to:
analyze video frame data from the first media item; and
obtain a visual context with a video context detector selected from an image luminosity algorithm or a frame differential algorithm.

4. The computer system of claim 3, wherein the one or more processors are further configured to calculate an image luminosity with the image luminosity algorithm to determine an average brightness of image data for frames of the video frame data.

5. The computer system of claim 3, wherein the one or more processors are further configured to calculate a frame difference between consecutive pairs of frames of the video frame data.

6. The computer system of claim 3, wherein the one or more processors are further configured to determine that video data for each of the segments that are common are substantially similar if a differential for the video data of the first media item and the second media item with the matching signature is less than a predetermined threshold.

7. The computer system of claim 3, wherein the one or more processors are further configured to, frame crop the video frame data to capture approximately a same pixel data for each frame in different versions of the first media item.

8. The computer system of claim 2, wherein additional contextual data comprises narrative context, and
the one or more processors are further configured to:
map the one or more segments that are common between the sample of the first media item and the second media item;
obtain a first media playlist associated with each of the one or more mapped segments;
compare a second media playlist including the segments that are common for the first media item with the first media playlist for the second media item with the matching signature; and
categorize relationships between the first and second media playlists into at least one of a plurality of relationship categories.

9. The computer system of claim 8, wherein the one or more processors are further configured to employ direct audio/video comparison techniques to generate the media playlists.

10. The computer system of claim 8, wherein the one or more processors are further configured to employ automated content recognition (ACR) fingerprint comparison to generate the media playlists.

11. The computer system of claim 1, wherein the one or more processors are further configured to process the segments that are common using an edit distance algorithm to obtain a narrative context.

12. The computer system of claim 1, wherein to determine, using the second technique, a difference, the one or more processors are further configured to:
determine a contextual relationship between the first media item and the second media item by:
identifying a longest sequence of in-order segments between the first media item and the second media item,
selecting a longer media item between the first media item and the second media item, and
determining a percentage of the selected longer media item comprising the longest sequence of in-order segments.

13. The computer system of claim 1, wherein to determine, using the second technique, a difference, the one or more processors are further configured to:
determine a contextual relationship between the first media item and the second media item by:
identifying the segments that are common between the first media item and the second media item, and
in response to selecting a longer media item between the first media item and the second media item, determining a percentage of the selected longer media item comprising the segments that are common.

14. A method comprising:
receiving a sample of a first media item;
comparing the sample of the first media item using a signature database to identify at least a second media item based on a matching signature, wherein the signature database comprises unique signatures for each of a plurality of media items;
identifying, by one or more processors and using a first technique, one or more segments that are common between one or more first segments in of the sample of the first media item and one or more second segments in the second media item;
determining, using a second technique that is different than the first technique, for each of the one or more segments that are common, a difference for that segment between the sample of the first media item and the second media item; and provide, for a target device, access to the second media item based on the difference for each of the one or more segments that are common between the sample of the first media item and the second media item.

15. The method of claim 14 wherein determining, using the second technique, a difference, further comprises:

analyzing video frame data from the first media item; and obtaining a visual context with a video context detector selected from an image luminosity algorithm or a frame differential algorithm.

16. The method of claim 15 further comprising calculating an image luminosity with the image luminosity algorithm to determine an average brightness of image data for frames of the video frame data.

17. The method of claim 15 further comprising calculating a frame difference between consecutive pairs of frames of the video frame data.

18. The method of claim 14, wherein determining, using the second technique, a difference further comprises determining that video data for the segments that are common are substantially similar if a differential for the video data of the first media item and the second media item with the matching signature is less than a predetermined threshold.

19. The method of claim 15 further comprising:

mapping the one or more segments that are common between the sample of the first media item and the second media item;

obtaining a first media playlist associated with each of the one or more mapped segments;

comparing a second media playlist including the segments that are common for the first media item with the media playlist for the second media item; and categorizing the relationships between the first and second media playlists into at least one of a plurality of relationship categories.

20. The method of claim 14 further comprising processing the segments that are common using an edit distance algorithm.

21. The method of claim 14, wherein determining, using the second technique, the difference comprises:

determining a contextual relationship between the first media item and the second media item by:

identifying a longest sequence of in-order segments between first media item and the second media item, and in response to selecting a longer media item between the first media item and the second media item, determining a percentage of the selected longer media item comprising the longest sequence of in-order segments.

22. The method of claim 14, wherein the difference between the segments that are common is based on at least analysis of adjacent frames of the segments that are common.

23. The method of claim 19, wherein each of the media playlists references a specific list of segments, and each segment includes a segment ID and time information.

24. The method of claim 19, wherein the media playlists are associated with streaming segments of media.

25. The computer system of claim 1, wherein the difference between segments that are common is based on at least analysis of adjacent frames of the segments that are common.

26. The computer system of claim 8, wherein each of the media playlists references a specific list of segments, and each segment includes a segment ID and time information.

27. The computer system of claim 8, wherein the relationship categories comprise at least one of a no match, sampling, mixed sampling, mixed alternate version, cut, mixed cut, alternative version, and full match.

28. The computer system of claim 11, wherein the narrative context is based on a set of edit distance thresholds.

29. The computer system of claim 1, wherein the first technique includes at least automated content recognition (ACR) comparison.

30. The computer system of claim 1, wherein the second technique includes at least one of a luminosity algorithm and a frame differential algorithm.

* * * * *